US011441447B2

(12) United States Patent
Shiramasa et al.

(10) Patent No.: US 11,441,447 B2
(45) Date of Patent: Sep. 13, 2022

(54) RING-SEGMENT SURFACE-SIDE MEMBER, RING-SEGMENT SUPPORT-SIDE MEMBER, RING SEGMENT, STATIONARY-SIDE MEMBER UNIT, AND METHOD

(71) Applicant: MITSUBISHI HITACHI POWER SYSTEMS, LTD., Kanagawa (JP)

(72) Inventors: Yamato Shiramasa, Kanagawa (JP); Ryuta Ito, Tokyo (JP); Takayuki Kurimura, Tokyo (JP); Yoshifumi Tsuji, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 218 days.

(21) Appl. No.: 16/476,209

(22) PCT Filed: Dec. 22, 2017

(86) PCT No.: PCT/JP2017/046068
§ 371 (c)(1),
(2) Date: Jul. 5, 2019

(87) PCT Pub. No.: WO2018/131425
PCT Pub. Date: Jul. 19, 2018

(65) Prior Publication Data
US 2021/0140340 A1 May 13, 2021

(30) Foreign Application Priority Data
Jan. 12, 2017 (JP) .............................. JP2017-003596

(51) Int. Cl.
*F01D 25/12* (2006.01)
*F02C 7/18* (2006.01)
(Continued)

(52) U.S. Cl.
CPC ................ *F01D 25/12* (2013.01); *F02C 7/18* (2013.01); *F01D 9/041* (2013.01); *F01D 11/18* (2013.01);
(Continued)

(58) Field of Classification Search
CPC .......... F01D 25/00; F01D 25/08; F01D 25/12; F01D 25/14; F01D 25/24; F01D 25/26;
(Continued)

(56) References Cited

U.S. PATENT DOCUMENTS 6,146,091 A * 11/2000 Watanabe ............... F01D 11/04
415/115
6,270,311 B1 8/2001 Kuwabara et al.
(Continued)

FOREIGN PATENT DOCUMENTS

CN 102472169 5/2012
CN 102782257 11/2012
(Continued)

OTHER PUBLICATIONS

International Search Report dated Mar. 20, 2018 in International (PCT) Application No. PCT/JP2017/046068 with English translation.
(Continued)

*Primary Examiner* — Woody A Lee, Jr.
*Assistant Examiner* — Justin A Pruitt
(74) *Attorney, Agent, or Firm* — Wenderoth, Lind & Ponack, L.L.P.

(57) ABSTRACT

A ring-segment surface-side member is included in a ring segment disposed at a position opposite to a turbine blade on a stationary side of a gas turbine, serves as a part of a combustion gas flow path through which combustion gas flows, and is formed of a ceramic matrix composite. The ring-segment surface-side member includes: a surface por-
(Continued)

tion forming the combustion gas flow path; a turned-back portion including a first part extending outward in a radial direction of the gas turbine from the surface portion and a second part extending toward a central line of the surface portion from an end part of the first part; and a protrusion portion extending outward from the turned-back portion in the radial direction of the gas turbine.

14 Claims, 12 Drawing Sheets

(51) Int. Cl.
| F01D 9/04 | (2006.01) |
| F01D 25/24 | (2006.01) |
| F01D 11/18 | (2006.01) |

(52) U.S. Cl.
CPC .......... *F01D 25/24* (2013.01); *F05D 2240/11* (2013.01); *F05D 2240/12* (2013.01); *F05D 2260/201* (2013.01); *F05D 2260/30* (2013.01); *F05D 2300/6033* (2013.01)

(58) Field of Classification Search
CPC . F01D 9/041; F01D 11/18; F02C 7/18; F05D 2240/11; F05D 2240/12; F05D 2260/201; F05D 2260/30; F05D 2300/6033; Y02T 50/60
USPC ...................................................... 415/173.1
See application file for complete search history.

(56) References Cited

U.S. PATENT DOCUMENTS

| 6,758,653 | B2 | 7/2004 | Morrison |
| 8,480,353 | B2 | 7/2013 | Koyabu et al. |
| 9,188,062 | B2 | 11/2015 | Tsutsumi et al. |
| 10,221,715 | B2* | 3/2019 | Varney .................... F01D 11/08 |
| 10,626,745 | B2 | 4/2020 | Rousille et al. |
| 2003/0133790 | A1* | 7/2003 | Darkins, Jr. .............. F01D 9/04 415/139 |
| 2005/0232752 | A1 | 10/2005 | Meisels |
| 2007/0077141 | A1 | 4/2007 | Keller |
| 2008/0101923 | A1 | 5/2008 | Botrel et al. |
| 2010/0266386 | A1* | 10/2010 | Broomer ................. F01D 25/12 415/115 |
| 2011/0182724 | A1 | 7/2011 | Koyabu et al. |
| 2015/0226124 | A1 | 8/2015 | Tsutsumi et al. |
| 2016/0258311 | A1 | 9/2016 | Varney et al. |
| 2016/0348528 | A1* | 12/2016 | Vetters .................. F01D 25/246 |
| 2017/0138211 | A1 | 5/2017 | Fukui et al. |
| 2017/0268362 | A1* | 9/2017 | McCaffrey .............. F01D 25/12 |
| 2018/0149034 | A1 | 5/2018 | Roussille et al. |

FOREIGN PATENT DOCUMENTS

| CN | 106133295 | 11/2016 |
| EP | 2 562 358 | 2/2013 |
| EP | 2 562 358 B1 | 1/2017 |
| JP | 2000-257447 | 9/2000 |
| JP | 2004-150325 | 5/2004 |
| JP | 2008-111441 | 5/2008 |
| JP | 2010-65634 | 3/2010 |
| JP | 2011-208624 | 10/2011 |
| JP | 2015-190354 | 11/2015 |
| KR | 10-2015-0032313 | 3/2015 |
| WO | 2016/189224 | 12/2016 |

OTHER PUBLICATIONS

Written Opinion of the International Searching Authority dated Mar. 20, 2018 in International (PCT) Application No. PCT/JP2017/046068 with English translation.
Office Action dated Apr. 22, 2021 in Chinese Application No. 201780083179.3 with English machine translation.
Notification of Reason for Refusal dated Jul. 29, 2020 in Korean Application No. 10-2019-7019896 with English translation.
Office Action dated Feb. 11, 2022 in German Application No. 11 2017 006 797.9 with English translation.

\* cited by examiner

RING-SEGMENT SURFACE-SIDE MEMBER, RING-SEGMENT SUPPORT-SIDE MEMBER, RING SEGMENT, STATIONARY-SIDE MEMBER UNIT, AND METHOD

FIELD

The present invention relates to a gas turbine rotated by combustion gas.

BACKGROUND

A conventionally known gas turbine includes a rotational shaft, a turbine blade extending radially outward with respect to the rotational shaft, a ring segment provided separately from the turbine blade on the outer side in the radial direction, and a turbine vane adjacent to the ring segment in the axial direction.

U.S. Pat. No. 6,758,653 discloses a ring segment including: a surface-side member disposed on a side facing a path through which combustion gas flows and formed of a ceramic matrix composite; and a support-side member disposed on the outer side of the surface-side member in the radial direction of a gas turbine, supporting the surface-side member, supported by a heat shielding ring segment, and formed of metal.

As disclosed in U.S. Pat. No. 6,758,653, higher durability can be achieved when a member formed of a ceramic matrix composite is disposed on a surface on which combustion gas flows than when a member formed of metal is disposed thereon. However, a structure disclosed in U.S. Pat. No. 6,758,653 has limits on improvement of the efficiency of cooling air supply. In addition, the structure disclosed in U.S. Pat. No. 6,758,653 has limits on improvement of the sealing performance of each component. Thus, improvement of the efficiency of the gas turbine is limited by at least one of the efficiency of cooling air and the sealing performance.

The present invention has an object to provide a ring-segment surface-side member, a ring-segment support-side member, a ring segment, a stationary-side member unit, a gas turbine including these components, a ring segment cooling method, and a ring segment manufacturing method that achieve higher efficiency of the gas turbine.

SUMMARY OF THE INVENTION

To solve the above-described problem, the present invention provides a ring-segment surface-side member that is included in a ring segment disposed at a position opposite to a turbine blade on a stationary side of a gas turbine, and serves as a part of a combustion gas flow path through which combustion gas flows. The ring-segment surface-side member is formed of a ceramic matrix composite. The ring-segment surface-side member includes a surface portion forming the combustion gas flow path; a turned-back portion coupled with the surface portion and including a first part extending outward in a radial direction of the gas turbine and a second part extending toward a central line of the surface portion from an end part of the first part; and a protrusion portion extending outward from the turned-back portion in the radial direction of the gas turbine.

To solve the above-described problem, the present invention provides a ring-segment support-side member that is included in a ring segment disposed at a position opposite to a turbine blade on a stationary side of a gas turbine, serves as a part of a combustion gas flow path through which combustion gas flows, and supports a ring-segment surface-side member. The ring-segment support-side member is formed of metal. The ring-segment support-side member includes an engagement portion to be engaged with the ring-segment surface-side member; and an opposing portion that faces a surface opposite to a surface portion of the ring-segment surface-side member, the surface portion forming the combustion gas flow path, and forms a cooling space in which cooling air flows between the opposing portion and the surface portion. The opposing portion includes a flow-path resistance adjustment mechanism configured to adjust a flow-path resistance of the cooling space.

It is preferable that the ring-segment support-side member includes a plurality of through-holes that connect the opposing portion with a cooling air supply space into which the cooling air is supplied, and through which the cooling air flows, and that the through-holes have sizes that vary in accordance with positions in the direction of combustion gas flow through the gas turbine.

It is preferable that the flow-path resistance adjustment mechanism has a structure in which a distance between the opposing portion and the ring-segment surface-side member varies with positions in the direction of combustion gas flow through the gas turbine.

It is preferable that the flow-path resistance adjustment mechanism includes the opposing portion, and the opposing portion has a surface roughness that varies with position. It is also preferable that the flow-path resistance adjustment mechanism includes the opposing portion, and an uneven part is formed at the opposing portion.

It is preferable that the flow-path resistance adjustment mechanism adjusts the pressure of cooling air flowing in the cooling space upstream in the direction of combustion gas flow through the gas turbine to be higher than the pressure of cooling air flowing in the cooling space downstream in the direction of combustion gas flow.

It is preferable that the flow-path resistance adjustment mechanism includes a partition that separates the cooling space into a plurality of spaces in a cross section orthogonal to a rotational direction.

It is preferable that the partition is provided integrally with the opposing portion.

It is preferable that the partition is a plate member inserted in a groove formed at a position facing the plate member.

It is preferable that a part, which comes in contact with a surface of the ring-segment surface-side member opposite to the surface portion, of the partition portion is made of a material other than metal.

It is preferable that a reaction prevention material is disposed at a part, which comes in contact with a surface of the ring-segment surface-side member opposite to the surface portion, of the partition portion.

To solve the above-described problem, the present invention provides a ring-segment support-side member that is included in a ring segment disposed at a position opposite to a turbine blade on a stationary side of a gas turbine and has an arc shape. The ring-segment support-side member includes a first engagement portion protruding in an axial direction of the arc shape; a second engagement portion formed on a central-point side of the arc shape and protruding in the axial direction; a through-hole formed along a central line of the arc shape; and a protrusion portion formed on a surface of the arc shape on the central line side, protruding toward the central line side, and extending in a direction of an arc of the arc shape.

To solve the above-described problem, the present invention provides a ring segment disposed at a position opposite to a turbine blade on a stationary side of a gas turbine. The ring segment includes: a ring-segment surface-side member serving as a part of a combustion gas flow path through which combustion gas flows and formed of a ceramic matrix composite; a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal; and a flow-path resistance adjustment mechanism disposed between a surface of the ring-segment surface-side member opposite to the surface portion and a back surface of the ring-segment support-side member facing the opposite surface and configured to adjust a flow-path resistance of the cooling space.

It is preferable that the flow-path resistance adjustment mechanism adjusts the pressure of cooling air flowing in the cooling space upstream in the direction of combustion gas flow through the gas turbine to be higher than the pressure of cooling air flowing in the cooling space downstream in the direction of combustion gas flow.

It is preferable that the flow-path resistance adjustment mechanism includes a partition that separates the cooling space into a plurality of spaces in a cross section orthogonal to a rotational direction, and the partition is provided integrally with the ring-segment surface-side member.

It is preferable that the partition is provided integrally with the ring-segment support-side member.

It is preferable that the partition is a plate member inserted in a groove formed at a position facing the plate member.

It is preferable that part, which comes in contact with a surface of the ring-segment surface-side member opposite to the surface portion, of the partition portion is made of a material other than metal.

It is preferable that a reaction prevention material is disposed at a part, which comes in contact with a surface of the ring-segment surface-side member opposite to the surface portion, of the partition portion.

To solve the above-described problem, the present invention provides a ring-segment support-side member that is included in a ring segment disposed at a position opposite to a turbine blade on a stationary side of a gas turbine, serves as a part of a combustion gas flow path through which combustion gas flows, and supports a ring-segment surface-side member. The ring-segment support-side member is formed of metal. The ring-segment support-side member includes an engagement portion to be engaged with the ring-segment surface-side member; an opposing portion that faces a surface opposite to a surface portion of the ring-segment surface-side member, the surface portion forming the combustion gas flow path, and forms a cooling space in which cooling air flows between the opposing portion and the surface portion; and a plurality of through-holes that connect the opposing portion with a cooling air supply space into which the cooling air is supplied, and through which the cooling air flows. A rotational direction of the gas turbine, a total area of the through-holes in a central region is larger than a total area of the through-holes in an end part region.

To solve the above-described problem, the present invention provides a ring-segment support-side member that is included in a ring segment disposed at a position opposite to a turbine blade on a stationary side of a gas turbine, serves as a part of a combustion gas flow path through which combustion gas flows, and supports a ring-segment surface-side member. The ring-segment support-side member is formed of metal. The ring-segment support-side member includes an engagement portion to be engaged with the ring-segment surface-side member; an opposing portion that faces a surface opposite to a surface portion of the ring-segment surface-side member, the surface portion forming the combustion gas flow path, and forms a cooling space in which cooling air flows between the opposing portion and the surface portion; and a seal structure disposed on each of surfaces adjacent to each other in a rotational direction of the gas turbine and disposed on an inner side, in a radial direction of the gas turbine, of an end part of the engagement portion on an outer side in the radial direction.

It is preferable that the seal structure includes a seal groove and a seal plate inserted into the seal groove, and the seal plate is made of a material different from the material of the ring-segment surface-side member. It is preferable that the seal plate is made of metal.

It is preferable that the seal structure seals a gap with another ring-segment support-side member adjacent in a circumferential direction.

It is preferable that the ring-segment support-side member further includes an outer seal mechanism disposed on an outer side of the seal structure in the radial direction to seal a gap with another member adjacent thereto in an axial direction of the gas turbine.

To solve the above-described problem, the present invention provides a ring segment disposed at a position opposite to a turbine blade on a stationary side of a gas turbine. The ring segment includes a ring-segment surface-side member serving as a part of a combustion gas flow path through which combustion gas flows and formed of a ceramic matrix composite; and a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal. The ring-segment surface-side member includes a surface portion forming the combustion gas flow path, and a turned-back portion coupled with the surface portion and locked to the ring-segment support-side member. The ring-segment support-side member includes a seal structure disposed on a surface adjacent in a rotational direction of the gas turbine and disposed on an inner side in the radial direction relative to an end part of the turned-back portion on the outer side in the radial direction of the gas turbine.

It is preferable that the seal structure includes a seal groove and a seal plate inserted into the seal groove, and the seal plate is made of a material different from the material of the ring-segment surface-side member. It is preferable that the seal plate is made of metal.

To solve the above-described problem, the present invention provides a ring segment that includes the ring-segment surface-side member described above; and a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal. The ring-segment surface-side member includes a seal mechanism at at least one of a position upstream of the protrusion portion positioned on an upstream side in combustion gas flow and a position downstream of the protrusion portion positioned on a downstream side in the combustion gas flow.

To solve the above-described problem, the present invention provides a ring segment disposed at a position opposite to a turbine blade on a stationary side of a gas turbine. The ring segment includes a ring-segment surface-side member serving as a part of a combustion gas flow path through which combustion gas flows and formed of a ceramic matrix composite; and a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal. The ring-segment support-side member includes a seal mechanism extending in an axial direction of the gas turbine, having both ends being in contact with members adjacent thereto in the axial direction, and sealing air flow in the radial direction of the gas turbine. The ring-segment surface-side member is disposed on an inner side of the seal mechanism in the radial direction of the gas turbine.

It is preferable that the ring-segment surface-side member is supported at a position separated, in the radial direction of the gas turbine, from a position at which the ring-segment support-side member is supported by another member.

To solve the above-described problem, the present invention provides a stationary-side member unit that includes a ring segment disposed at a position opposite to a turbine blade on a stationary side of a gas turbine; and heat shielding rings disposed adjacent to both ends of the ring segment to sandwich the ring segment in an axial direction of the gas turbine. The ring segment includes a ring-segment surface-side member serving as a part of a combustion gas flow path through which combustion gas flows and formed of a ceramic matrix composite. The heat shielding rings include a side-surface seal mechanism that seals a gap between the heat shielding rings. Both ends of the ring-segment surface-side member in the axial direction of the gas turbine are in contact with the side-surface seal mechanism.

It is preferable that the ring segment includes a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal; both ends of the ring-segment support-side member in the axial direction of the gas turbine are in contact with the side-surface seal mechanism; and the ring-segment support-side member includes a support-side seal mechanism that seals a gap with an adjacent ring-segment support-side member.

It is preferable that the ring-segment surface-side member includes a surface portion facing the gas turbine, a turned-back portion coupled with the surface portion and including a first part extending outward in the radial direction of the gas turbine and a second part extending toward a central line of the surface portion from an end part of the first part, and a protrusion portion extending outward from the turned-back portion in the radial direction of the gas turbine and facing the heat shielding ring.

It is preferable that the side-surface seal mechanism includes a first ring-segment seal mechanism that seals a gap between the heat shielding ring and the ring-segment surface-side member.

It is preferable that the first ring-segment seal mechanism blocks air flow in the radial direction of the gas turbine.

To solve the above-described problem, the present invention provides a gas turbine that includes a turbine blade attached to a rotatable turbine shaft; a turbine vane fixed facing the turbine blade in an axial direction; the ring segment according to claim 12 or 13; and a casing chamber disposed on an outer periphery of the ring segment and supporting the turbine vane.

To solve the above-described problem, the present invention provides a ring-segment cooling method for a ring segment disposed at a position opposite to a turbine blade on a stationary side of a gas turbine. The gas turbine includes: a ring-segment surface-side member serving as a part of a combustion gas flow path through which combustion gas flows and formed of a ceramic matrix composite; and a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal. The method includes the step of supplying the cooling air from the ring-segment support-side member to the cooling space; and the step of causing the cooling air supplied to the cooling space to flow in the rotational direction of the gas turbine.

It is preferable that the cooling air supplied to the cooling space flows in both directions along the rotational direction of the gas turbine from a position at which the cooling air is supplied to the cooling space.

It is preferable that the cooling air having passed through the cooling space flows through a gap between the ring-segment support-side member and an adjacent ring-segment support-side member.

It is preferable that the cooling air supplied to the cooling space also flows through a gap between a side surface of the ring-segment support-side member in the axial direction and a side surface member of the ring-segment surface-side member.

To solve the above-described problem, the present invention provides a ring segment manufacturing method of manufacturing a ring segment of a gas turbine. The ring segment manufacturing method includes a step of manufacturing a ring-segment surface-side member from a ceramic matrix composite; a step of manufacturing a ring-segment support-side member from metal; and a step of forming a cooling space between the ring-segment surface-side member and the ring-segment support-side member by fitting the ring-segment surface-side member to the ring-segment support-side member while a protrusion portion of the ring-segment surface-side member is positioned on an outer side of a protrusion portion of the ring-segment support-side portion in a radial direction of the gas turbine.

Advantageous Effects of Invention

According to the present invention, it is possible to maintain high sealing property or efficiently supply cooling air. Accordingly, the efficiency of a gas turbine can be increased.

DESCRIPTION OF EMBODIMENTS

The present invention will be described below with reference to the accompanying drawings. The present invention is not limited by embodiments described below. Components in the embodiments described below include those easily replaceable by the skilled person in the art or those identical in effect. The embodiments describe below a case of an industrial gas turbine, but the present invention is applicable to any gas turbine, for example, a gas turbine engine used in an aircraft.

Figure 1:
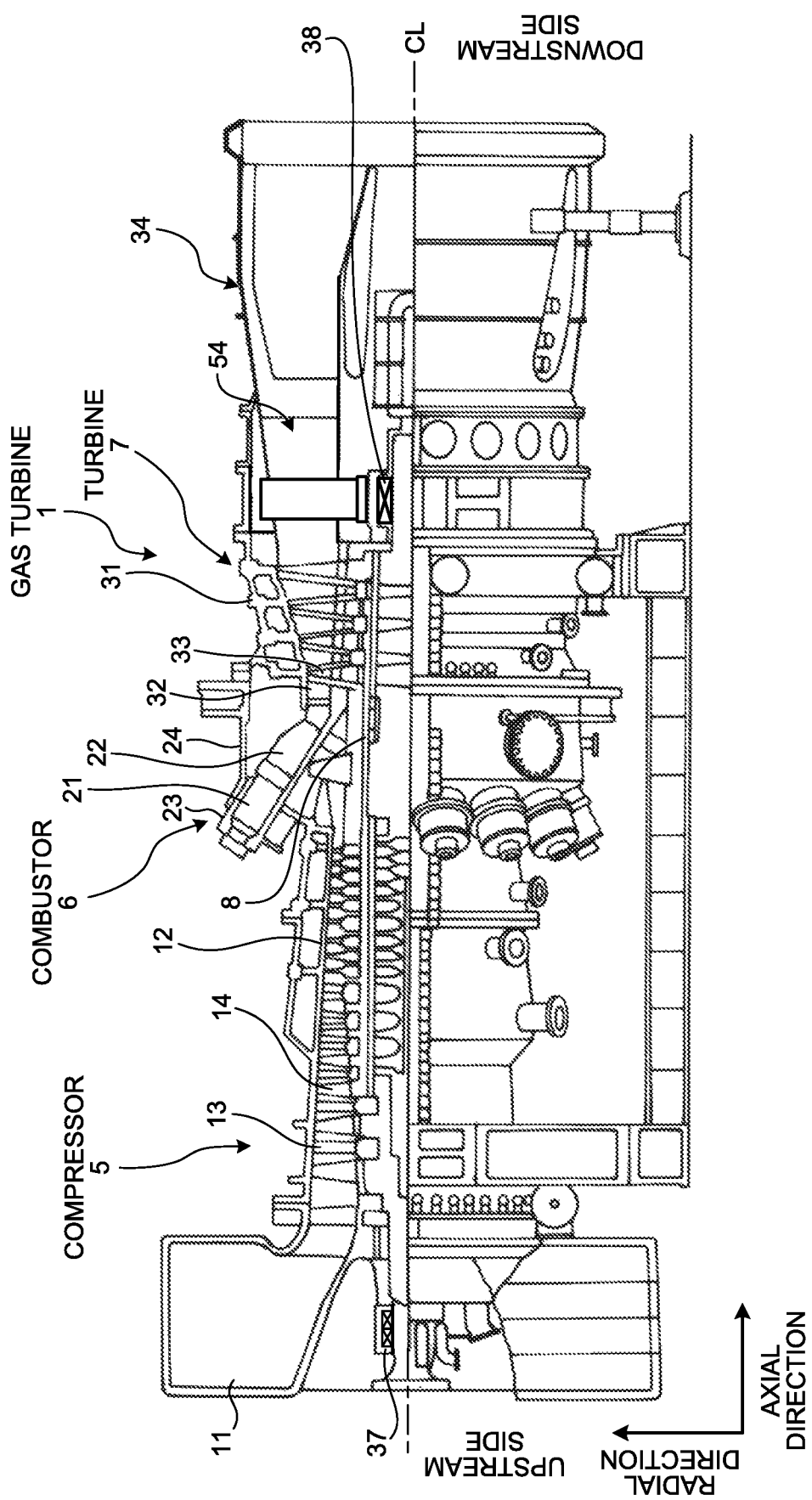
FIG. 1 is a schematic configuration diagram of a gas turbine according to an embodiment.

As illustrated in FIG. 1, a gas turbine 1 includes a compressor 5, a combustor 6, and a turbine 7. A turbine shaft 8 penetrates through central parts of the compressor 5, the combustor 6, and the turbine 7. The compressor 5, the combustor 6, and the turbine 7 are sequentially arranged in a row along a center axis CL of the turbine shaft 8 from the upstream side toward the downstream side in the flow direction of air or combustion gas.

The compressor 5 compresses air into compressed air. The compressor 5 includes a plurality of stages of compressor vanes 13 and a plurality of stages of compressor blades 14 in a compressor casing 12 including an air intake 11 through which air is taken in. The compressor vanes 13 of each stage are attached to the compressor casing 12 and arranged in a row in the circumferential direction, and the compressor blades 14 of each stage are attached to the turbine shaft 8 and arranged in a row in the circumferential direction. The plural-stage compressor vanes 13 and the plural-stage compressor blades 14 are alternately provided in the axial direction.

The combustor 6 generates high-temperature and high-pressure combustion gas by supplying fuel to the compressed air generated by the compressor 5. The combustor 6 includes an inner cylinder 21 as a combustion chamber in which the compressed air and the fuel are mixed and combusted, a transition piece 22 that guides the combustion gas from the inner cylinder 21 to the turbine 7, and an outer cylinder 23 that covers the outer periphery of the inner cylinder 21 and guides the compressed air from the compressor 5 to the inner cylinder 21. A plurality of combustors 6 are disposed in a turbine casing 31 and arranged in the circumferential direction. The air compressed by the compressor 5 is temporarily accumulated in a casing chamber 24 surrounded by the turbine casing 31, and thereafter supplied to the combustor 6.

The turbine 7 receives rotational power from the combustion gas generated by the combustor 6. The turbine 7 includes a plurality of stages of the turbine vanes 32 and a plurality of stages of the turbine blades 33 in the turbine casing 31 serving as an outer shell. The turbine vanes 32 of each stage are attached to the turbine casing 31 and disposed annularly in the circumferential direction, and the turbine blades 33 of each stage are fixed to the outer periphery of a disk about the center axis CL of the turbine shaft 8 and disposed annularly in the circumferential direction. The plural-stage turbine vanes 32 and the plural-stage turbine blades 33 are alternately provided in the axial direction.

An air discharge chamber 34 including inside a diffuser unit 54 continuous with the turbine 7 is provided downstream of the turbine casing 31 in the axial direction, (refer to FIG. 1). An end part of the turbine shaft 8 on the compressor 5 side is supported by a bearing 37, and the other end part on the air discharge chamber 34 side is supported by a bearing 38 and, so that the turbine shaft 8 is provided rotatably about the center axis CL. The end part of the turbine shaft 8 on the air discharge chamber 34 side is coupled with the drive shaft of an electric generator (not illustrated).

Figure 2:
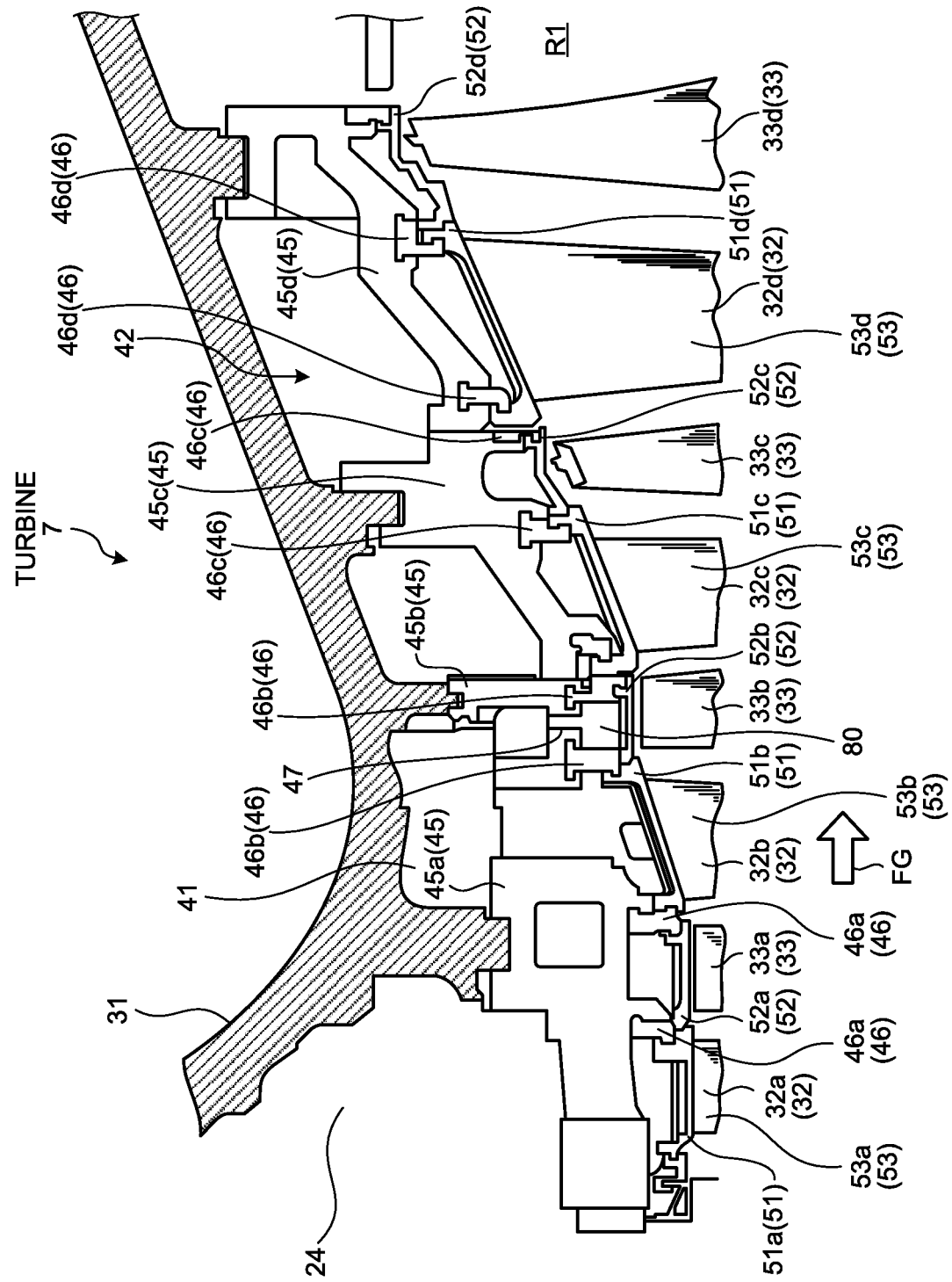
FIG. 2 is a partial cross-sectional view around a turbine of the gas turbine according to the embodiment.

The following specifically describes the turbine 7 with reference to FIG. 2. As illustrated in FIG. 2, the turbine vane 32 is integrally formed of an outer shroud 51, a vane-shaped portion 53 extending inward in the radial direction from the outer shroud 51, and an inner shroud (not illustrated) provided on the inner side of the vane-shaped portion 53 in the radial direction. The turbine vane 32 is supported by the turbine casing 31 through a heat shielding ring 46 and a vane ring 45, and serves as a fixation side. The plural-stage turbine vanes 32 include, sequentially from the upstream side in a flow direction FG of the combustion gas, a first turbine vane 32a, a second turbine vane 32b, a third turbine vane 32c, and a fourth turbine vane 32d. The first turbine vane 32a is integrally formed of an outer shroud 51a, a vane-shaped portion 53a, and an inner shroud (not illustrated). The second turbine vane 32b is integrally formed of an outer shroud 51b, a vane-shaped portion 53b, and an inner shroud (not illustrated). The third turbine vane 32c is integrally formed of an outer shroud 51c, a vane-shaped portion 53c, and an inner shroud (not illustrated). The fourth turbine vane 32d is integrally formed of an outer shroud 51d, a vane-shaped portion 53d, and an inner shroud (not illustrated).

The turbine blades 33 are disposed on the inner side of a plurality of respective ring segments 52 in the radial direction, facing the ring segments 52. The turbine blade 33 is provided separately from the corresponding ring segment 52 with a predetermined gap therebetween, and serves as a moving side. The plural-stage turbine blades 33 include, sequentially from the upstream side in the flow direction FG of the combustion gas, a first turbine blade 33a, a second turbine blade 33b, a third turbine blade 33c, and a fourth turbine blade 33d. The first turbine blade 33a is provided on the inner side of a first ring segment 52a in the radial direction. Similarly, the second turbine blade 33b, the third turbine blade 33c, and the fourth turbine blade 33d are provided on the inner side of a second ring segment 52b, a third ring segment 52c, and a fourth ring segment 52d, respectively, in the radial direction.

Accordingly, the plural-stage turbine vanes 32 and the plural-stage turbine blades 33 are disposed sequentially from the upstream side in the flow direction FG of the combustion gas in the order of the first turbine vane 32a, the first turbine blade 33a, the second turbine vane 32b, the second turbine blade 33b, the third turbine vane 32c, the third turbine blade 33c, the fourth turbine vane 32d, and the fourth turbine blade 33d, and they are provided in the axial direction so as to face each other.

As illustrated in FIG. 2, the turbine casing 31 includes the vane rings 45 disposed on the inner side thereof in the radial direction and supported by the turbine casing 31. The vane ring 45 is formed annularly about the turbine shaft 8, divided into a plurality of pieces in the circumferential direction and the axial direction, and supported by the turbine casing 31. The vane rings 45 include, sequentially from the upstream side in the flow direction (axial direction) FG of the combustion gas, a first vane ring 45a, a second vane ring 45b, a third vane ring 45c, and a fourth vane ring 45d. The heat shielding ring 46 is disposed on the inner side of each vane ring 45 in the radial direction, and the turbine vane 32 is supported by the vane ring 45 through the heat shielding ring 46. The heat shielding rings 46 include, sequentially from the upstream side in the flow direction (axial direction) FG of the combustion gas, a first heat shielding ring 46a, a second heat shielding ring 46b, a third heat shielding ring 46c, and a fourth heat shielding ring 46d.

The turbine vanes 32 and the ring segments 52 are provided adjacent to each other in the axial direction on the inner side of the vane rings 45.

The plural-stage turbine vanes 32 and the ring segments 52 are disposed sequentially from the upstream side in the flow direction FG of the combustion gas in the order of the first turbine vane 32a, the first ring segment 52a, the second turbine vane 32b, the second ring segment 52b, the third turbine vane 32c, the third ring segment 52c, the fourth turbine vane 32d, and the fourth ring segment 52d, and they are provided in the axial direction so as to face each other.

The first turbine vane 32a and the first ring segment 52a are attached to the first vane ring 45a on the inner side in the radial direction through the first heat shielding ring 46a. Similarly, the second turbine vane 32b and the second ring segment 52b are attached to the second vane ring 45b on the inner side in the radial direction through the second heat shielding ring 46b, the third turbine vane 32c and the third ring segment 52c are attached to the third vane ring 45c on the inner side in the radial direction through the third heat shielding ring 46c, and the fourth turbine vane 32d and the fourth ring segment 52d are attached to the fourth vane ring 45d on the inner side in the radial direction through the fourth heat shielding ring 46d.

A combustion gas flow path R1 is an annular flow path formed on inner peripherals of the outer shrouds 51 of the plural-stage turbine vanes 32 and the ring segments 52, and outer peripherals of the inner shrouds of the plural-stage turbine vanes 32 and platforms of the plural-stage turbine blades 33. The combustion gas flows along the combustion gas flow path R1.

In the gas turbine 1 as described above, when the turbine shaft 8 is rotated, air is taken in through the air intake 11 of the compressor 5. Then, the intake air is compressed into high-temperature and high-pressure compressed air while passing through the plural-stage compressor vanes 13 and the plural-stage compressor blades 14. Fuel is supplied from the combustor 6 to the compressed air to generate high-temperature and high-pressure combustion gas. The turbine shaft 8 is rotated as this combustion gas passes through the plural-stage turbine vanes 32 and the plural-stage turbine blades 33 of the turbine 7. Accordingly, rotational power is given to the electric generator coupled with the turbine shaft 8, so that the electric generator performs power generation. Thereafter, the combustion gas having rotated the turbine shaft 8 is discharged out of the system through the diffuser unit 54 in the air discharge chamber 34.

Figure 3:
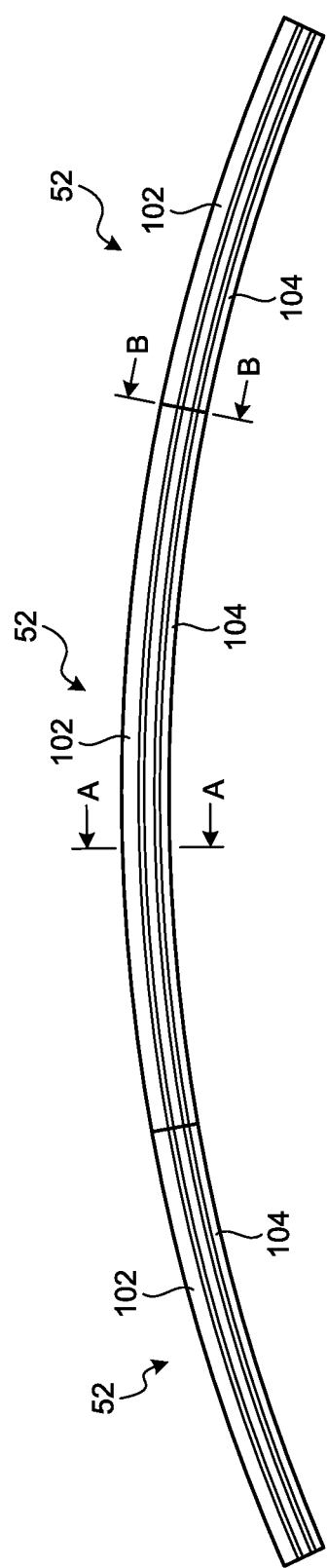
FIG. 3 is a side view of ring segments according to the embodiment.
Figure 4:
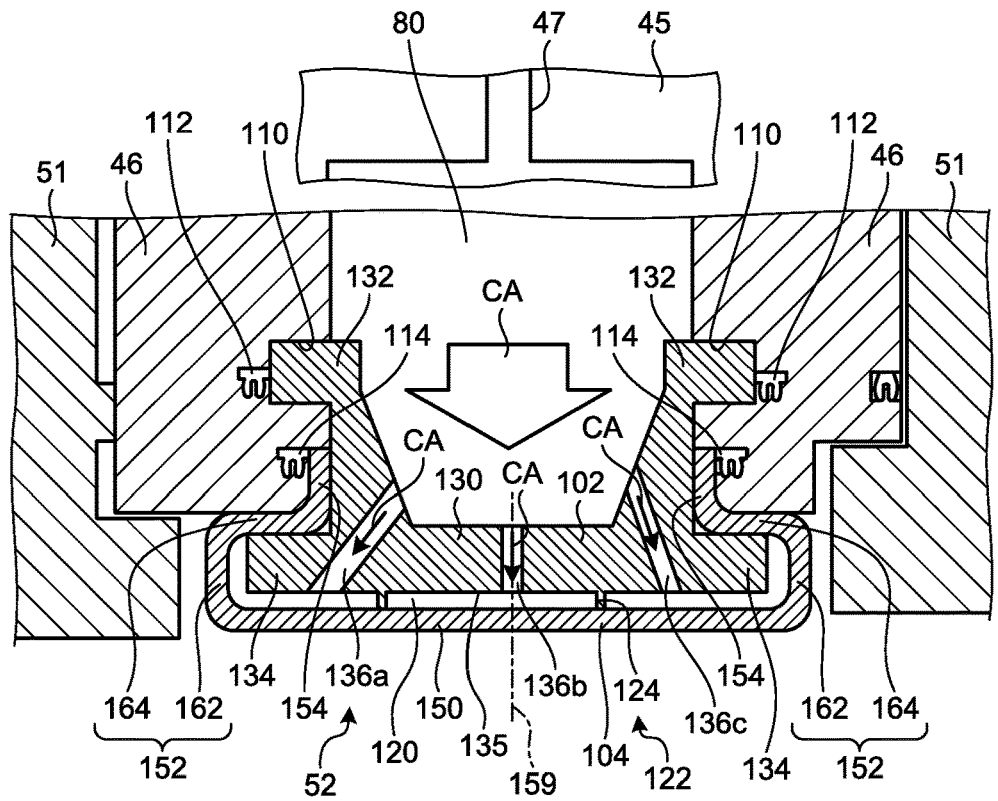
FIG. 4 is a partial enlarged diagram illustrating the vicinity of a cross-sectional surface of the ring segment of the gas turbine according to the embodiment.
Figure 5:
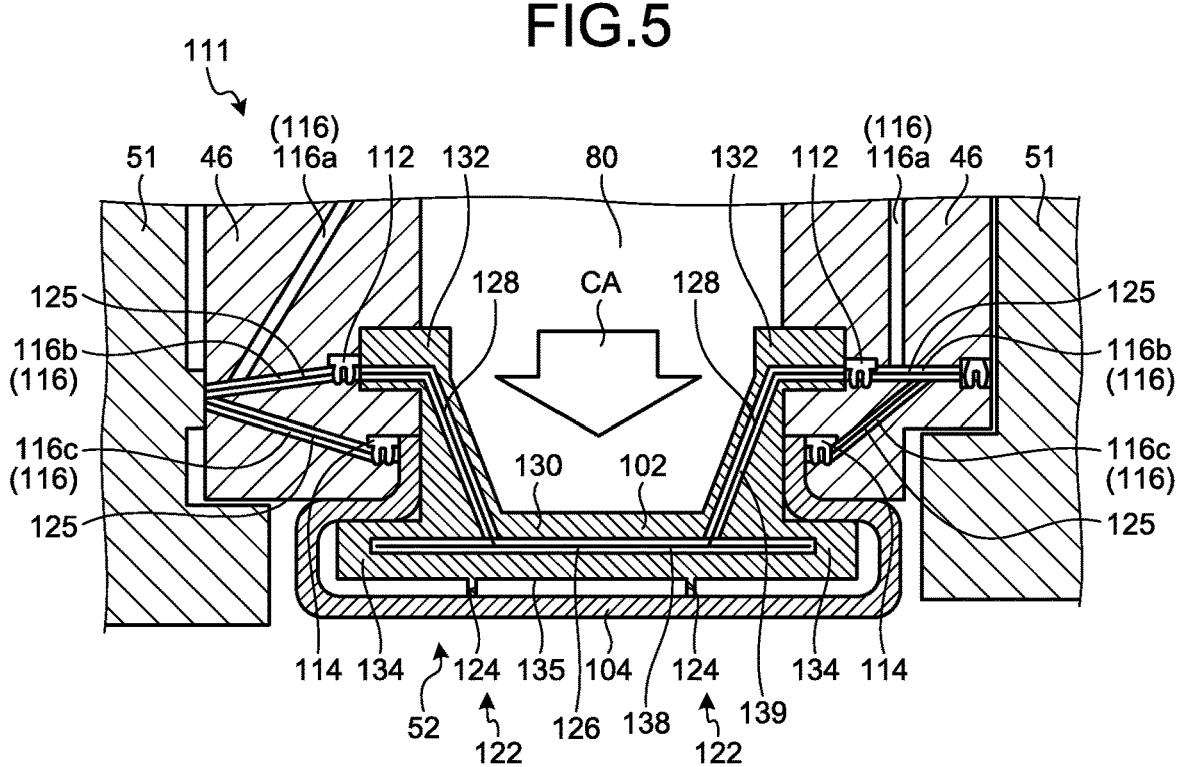
FIG. 5 is a partial enlarged diagram illustrating the vicinity of a side surface of the ring segment of the gas turbine according to the embodiment.

The following describes the ring segment 52 with reference to FIGS. 2 to 5. FIG. 3 is a side view of ring segments according to the present embodiment. FIG. 4 is a partial enlarged diagram illustrating the vicinity of a sectional-surface of the ring segment of the gas turbine according to the present embodiment. FIG. 5 is a partial enlarged diagram illustrating the vicinity of a side surface of the ring segment of the gas turbine according to the present embodiment. FIG. 4 is a cross-sectional view taken along line A-A in FIG. 3. FIG. 5 is a view from line B-B in FIG. 3. Although FIGS. 2 to 5 only illustrate a ring segment cooling structure around the second ring segment 52b, the other ring segments have the same structure, too. In the following description, the second ring segments 52b is simply referred to as the ring segment 52. In the gas turbine 1, a unit including the ring segment 52 and the corresponding heat shielding ring 46 is also referred to as a stationary-side member unit.

As illustrated in FIG. 3, in the gas turbine 1, the ring segments 52 are arranged in series in the rotational direction (the rotational direction of the gas turbine 1, the rotational direction of the turbine shaft 8, or the rotational direction of the turbine blades 33). The ring segments 52 are arranged in the rotational direction so as to form a ring shape. In other words, each ring segment 52 has an arc shape when viewed in the direction of the rotational axis. As described above, each ring segment 52 is disposed between the heat shielding rings 46 and supported by the heat shielding rings 46.

Cooling air supplied to the ring segment 52 is supplied from a vane ring cavity 41 surrounded by the casing chamber 24 and the vane ring 45 of the turbine 7. A supply opening 47 is formed in the vane ring 45. A cavity 80 is provided as a space surrounded by the heat shielding ring 46, the vane ring 45, and the ring segment 52. The cavity 80 is provided annularly in the circumferential direction. The cavity 80 is communicated with the vane ring cavity 41 through the supply opening 47. In addition, a cooling flow path communicated with the cavity 80 is formed in the ring segment 52. Cooling air CA supplied to the vane ring cavity 41 is supplied to the cavity 80 through the supply opening 47. As the cooling air CA according to the present embodiment, air in the casing chamber on the compressor exit side or bleed air from the compressor is used. The cooling air CA supplied to the cavity 80 is supplied to the ring segment 52 and passes through the cooling flow path disposed in the ring segment 52, thereby cooling the ring segment 52.

The heat shielding ring 46 is supported by the outer shroud 51 adjacent thereto. A recess 110 into which part of the ring segment 52 is inserted is formed at an end face of the heat shielding ring 46 in the direction of combustion gas flow, in other words, a surface in a direction orthogonal to the rotational axis. The recess 110 is formed in a surface facing the cavity 80. The recess 110 extends in the rotational axis direction of the gas turbine 1, and has a bottom surface at an end part of the recess 110 in the rotational axis direction of the gas turbine 1.

The heat shielding ring 46 includes seal mechanisms (a second ring-segment seal mechanism) 112 and seal mechanisms (a first ring-segment seal mechanism) 114 that seal a contact surface with the ring segment 52. The heat shielding ring 46 further includes seal grooves 116 in which seal plates 125 for sealing a gap with an adjacent heat shielding ring 46 are disposed. Seal air may be supplied to the seal grooves 116 (116a, 116b, or 116c) to press the seal mechanisms 112 and 114 toward the ring segment 52. The seal plates 125 are inserted into the seal grooves 116b and 116c among the seal grooves 116. The seal plates 125 are inserted into the two facing seal grooves 116b of the adjacent heat shielding rings 46 to seal the gap between the heat shielding rings 46. In addition, the seal plates 125 are inserted into the two facing seal grooves 116c of the adjacent heat shielding rings 46 to seal the gap between the heat shielding rings 46. A side-surface seal mechanism is formed by the seal grooves 116b and 116c, the seal plates 125 inserted into the seal grooves 116b and 116c, and the seal mechanisms 112 and 114 that are in contact with the seal plates 125. A heat shielding ring seal mechanism 111 is formed by the seal mechanisms 112 and 114, the seal grooves 116, the seal plates 125 of the heat shielding rings 46. The seal mechanism 112 is disposed on the bottom surface of the recess 110. In other words, the seal mechanism 112 is in contact with a surface of the ring segment 52 orthogonal to the rotational axis of the gas turbine 1. The seal mechanism 114 is positioned on the inner side of the seal mechanism 112 in the radial direction of the gas turbine 1 on a surface of the heat shielding ring 46 in the direction orthogonal to the rotational axis. Similarly to the seal mechanism 112, the seal mechanism 114 is in contact with the surface of the ring segment 52 orthogonal to the rotational axis of the gas turbine 1. The seal mechanisms 112 and 114 are formed of a thermal-resistant material same as that of the heat shielding ring 46, and have elasticity. The seal mechanisms 112 and 114 may be, for example, E seal. The seal mechanisms 112 and 114 block air flow in the radial direction of the gas turbine at the installed positions. Each seal groove 116 into which the seal plate 125 is inserted seals the gap between the heat shielding rings 46. The seal groove 116 bifurcates into a plurality of parts, and an end part of each bifurcated part faces the seal mechanism 112 or 114. Specifically, the seal grooves 116 include the seal grooves 116a, 116b, and 116c. The seal groove 116a is connected with a seal air supply source configured to supply seal air. The seal groove 116b is connected with the seal groove 116a. The seal groove 116b has one end part facing the outer shroud 51, and the other end part facing the seal mechanism 112. A seal mechanism is disposed between the seal groove 116b and the outer shroud 51 at the one end part. The seal groove 116c has one end part connected with the seal groove 116b, and the other end part facing the seal mechanism 114. Seal air having a pressure higher than that of air supplied to the cavity 80 is supplied to the seal grooves 116. The combustion gas is prevented from leaking through the gap between the heat shielding ring 46 and another member. The air supplied to the seal grooves 116 presses the seal mechanisms 112 and 114 toward the ring segment 52. Accordingly, the gap between the heat shielding ring 46 and the ring segment 52 is sealed to prevent the cooling air CA from leaking through the gap between the heat shielding ring 46 and the ring segment 52. When the seal air is supplied to the seal mechanisms 112 and 114 through the seal grooves 116, part of the seal air leaks when air leak occurs. The seal mechanisms 112 and 114 according to the present embodiment each includes an elastic member that becomes in contact with a sealing target in the groove shape to achieve sealing, but the present invention is not limited thereto, and only grooves may be provided. In this case, the seal mechanisms 112 and 114 prevent leaking of sealing target gas (gas to be prevented from leaking) by causing the seal air to be supplied to the seal grooves and to leak to another region.

The ring segments 52 have the same shape of the cross section in the rotational direction (surfaces orthogonal to the rotational direction). The ring segment 52 includes a ring-segment support-side member 102 and a ring-segment surface-side member 104. The ring-segment support-side member 102 is coupled with the heat shielding rings 46. The ring-segment support-side member 102 is supported by the heat shielding rings 46. The ring-segment surface-side member 104 is disposed on the inner side of the ring-segment support-side member 102 in the radial direction of the gas turbine 1 (the radial direction of the turbine shaft 8) and supported by the ring-segment support-side member 102. The ring-segment surface-side member 104 is exposed to a flow path through which the combustion gas flows, and faces the corresponding turbine blade 33. A cooling flow path 120 is provided between the ring-segment support-side member 102 and the ring-segment surface-side member 104. The following describes each component.

Figure 6:
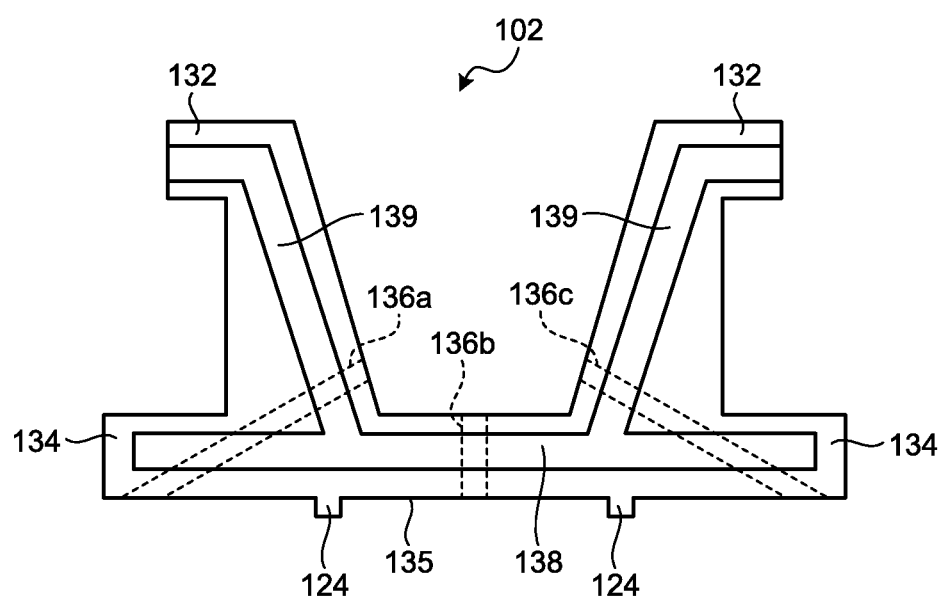
FIG. 6 is a front view of a ring-segment support-side member of the ring segment according to the embodiment.
Figure 7:
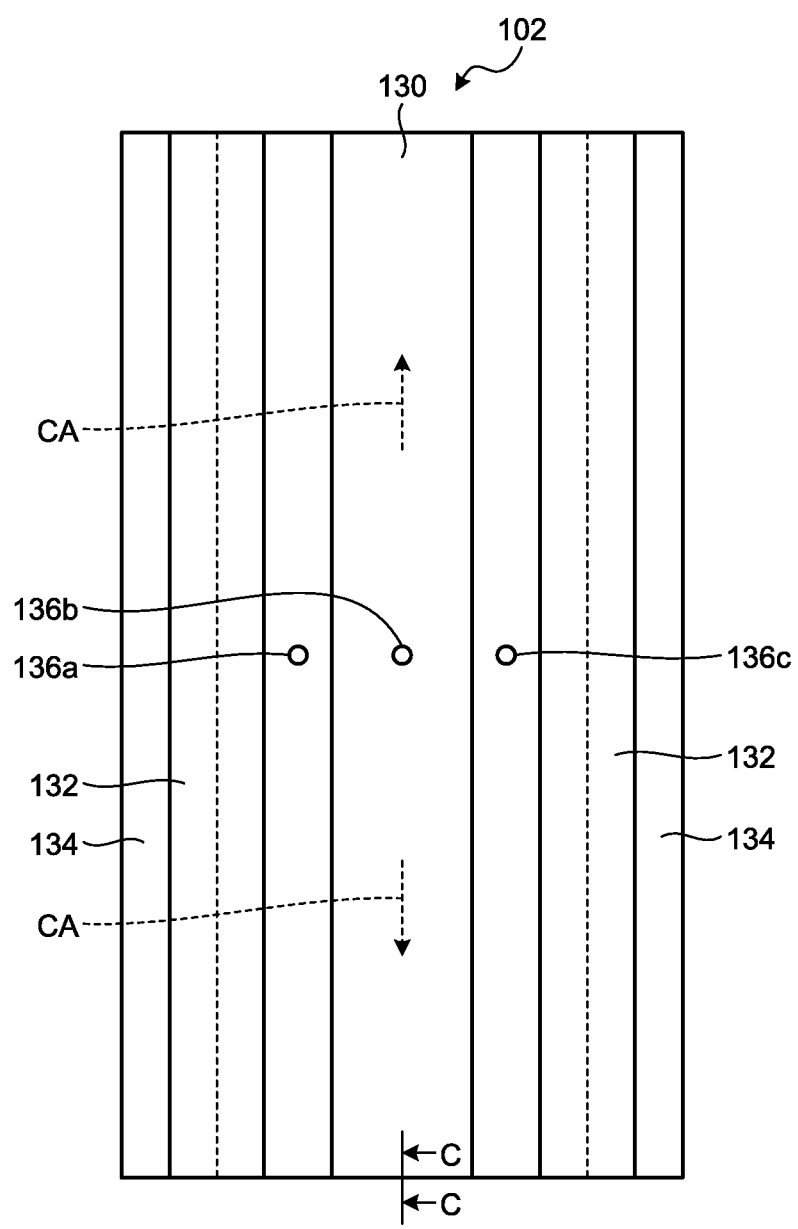
FIG. 7 is a top view of the ring-segment support-side member of the ring segment according to the embodiment.
Figure 8:
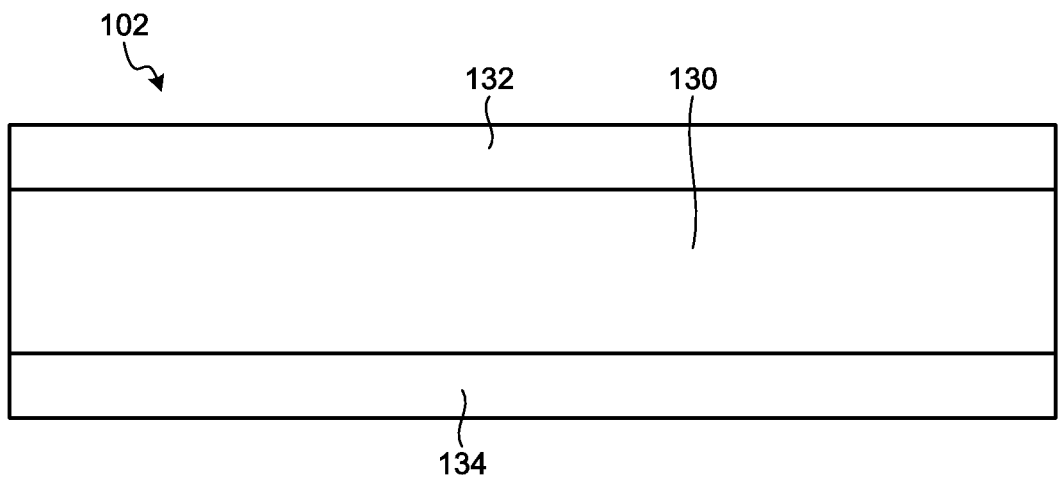
FIG. 8 is a side view of the ring-segment support-side member of the ring segment according to the embodiment.
Figure 9:
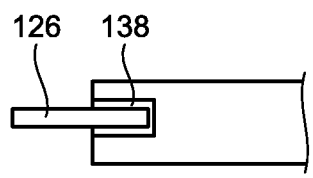
FIG. 9 is a cross-sectional view of an end part of the ring-segment support-side member of the ring segment according to the embodiment in a rotational direction.

The following describes the ring-segment support-side member 102 in detail with reference to FIGS. 3 to 9. FIG. 6 is a front view of the ring-segment support-side member of the ring segment according to the present embodiment. FIG. 7 is a top view of the ring-segment support-side member of the ring segment according to the present embodiment. FIG. 8 is a side view of the ring-segment support-side member of the ring segment according to the present embodiment. FIG. 9 is a cross-sectional view of an end part of the ring-segment support-side member of the ring segment according to the present embodiment in the rotational direction. FIG. 9 is a cross-sectional view taken along line C-C in FIG. 7. The shape of the gas turbine 1 in the circumferential direction is illustrated with straight lines in FIGS. 6 to 9, but is an arc shape as illustrated in FIG. 3.

The ring-segment support-side member (also simply referred to as "support-side member") 102 is a component on the stationary side of the gas turbine 1, and supports the ring-segment surface-side member 104. The support-side member 102 is formed of metal, for example, a thermal-resistant nickel alloy. The support-side member 102 is an integrally molded component including a body portion 130, first protrusion portions (first engagement portion) 132, and second protrusion portions (second engagement portion) 134. An opposing portion (opposing surface) 135 is an end face of the support-side member 102 on the inner side in the radial direction of the gas turbine 1. A flow-path resistance adjustment mechanism 122 is formed at the opposing portion 135. Through-holes 136a, 136b, and 136c are formed at the support-side member 102.

The body portion 130 is a plate member having a recess on the cavity 80 side as illustrated in FIGS. 4 to 6. With a shape having the recess, the body portion 130 has an increased area of contact with the cavity 80. The first protrusion portions 132 are provided at both ends of the body portion 130 in the axial direction of the gas turbine 1. The first protrusion portions 132 protrude further in the axial direction of the gas turbine 1 than the body portion 130. Each first protrusion portion 132 is inserted into the recess 110 of the heat shielding ring 46. An end part of the first protrusion portion 132 in the axial direction of the gas turbine 1, in other words, a surface most separated from the body portion 130, is in contact with the seal mechanism 112.

The second protrusion portions 134 are provided on the inner side of the first protrusion portion 132 of the body portion 130 in the radial direction of the gas turbine 1. The second protrusion portions 134 are provided at both ends of the body portion 130 in the axial direction of the gas turbine 1. Each second protrusion portion 134 is an engagement portion with which the ring-segment surface-side member 104 is engaged. In the support-side member 102, an end face of the second protrusion portion 134 on the inner side in the radial direction of the gas turbine 1 and an end face of the body portion 130 on the inner side in the radial direction form the same plane serving as the opposing portion 135.

The through-holes 136a, 136b, and 136c are paths connecting the cavity 80 with the cooling flow path 120 formed between the support-side member 102 and the ring-segment surface-side member 104. The through-holes 136a, 136b, and 136c are formed in the order from the upstream side toward the downstream side in the direction of combustion gas flow. The through-holes 136a, 136b, and 136c according to the present embodiment are positioned at the center of the support-side member 102 in the rotational direction of the gas turbine 1.

Seal grooves 138 and 139 are formed at each end face of the support-side member 102 in the rotational direction of the gas turbine 1. The seal groove 138 extends in a direction parallel to the axial direction of the gas turbine 1, and has one end part formed at one of the second protrusion portions 134 and the other end part formed at the other second protrusion portion 134. The seal groove 139 has one end part in contact with the seal groove 138 and the other end part formed at the first protrusion portion 132 on the other side. The other end part of the seal groove 139 is formed up to a position in contact with the seal mechanism 112. Accordingly, in the support-side member 102, the seal grooves 138 and 139 form a groove connecting the seal mechanism 112 and the other seal mechanism 112. As illustrated in FIG. 9, a seal plate 126 is inserted into the seal groove 138. Similarly, a seal plate 128 is inserted into the seal groove 139. The seal plates 126 are inserted into the seal grooves 138 and 139 of the two support-side members 102 facing each other to seal the gap between the support-side members 102 in the rotational direction of the gas turbine 1. The seal plates 128 are in contact with the seal plates 126 to seal the gap between the seal mechanisms 112 and between the adjacent support-side members 102. A support-side seal mechanism is formed by the seal plates 126 and 128. In this manner, in the ring segment 52, the seal plates 126 and 128 seal the gap between the support-side member 102 and the heat shielding ring 46, and accordingly, the seal mechanism 112 and the support-side member 102 seal the gap between the heat shielding rings 46. With this configuration, the cavity 80 and the combustion gas flow path are separated from each other by the seal plate 126 at each end part of the support-side member 102 in the rotational direction of the gas turbine 1. A side-surface seal mechanism including the seal groove 116b and the seal plate 125 inserted therein serves as a support-side member side-surface seal mechanism forming a seal structure connected with the support-side member 102 that is in contact with the seal mechanism 112.

Figure 10:
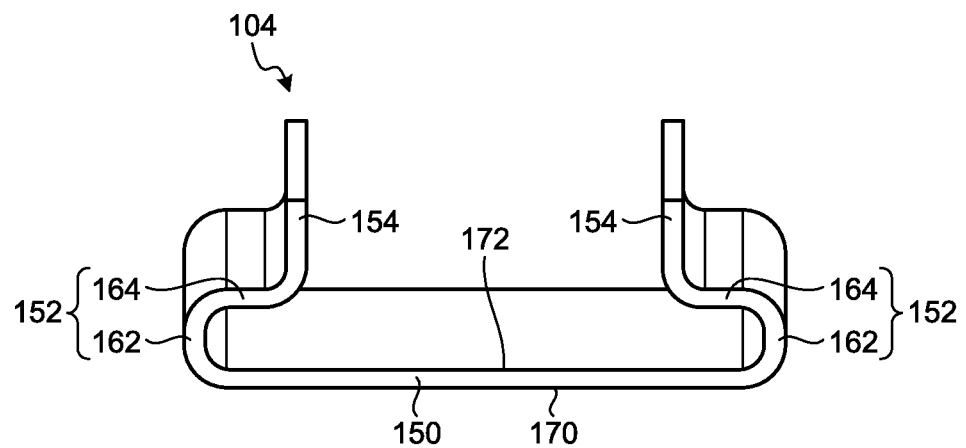
FIG. 10 is a perspective view of a ring-segment surface-side member of the ring segment according to the embodiment.
Figure 11:
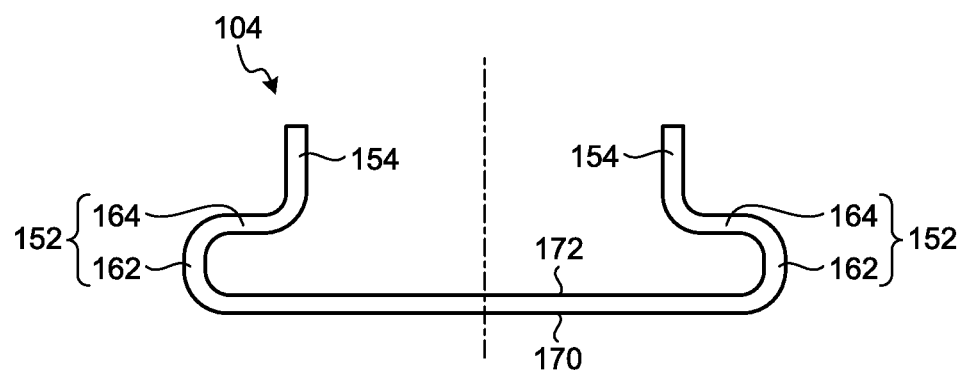
FIG. 11 is a front view of the ring-segment surface-side member of the ring segment according to the embodiment.
Figure 12:
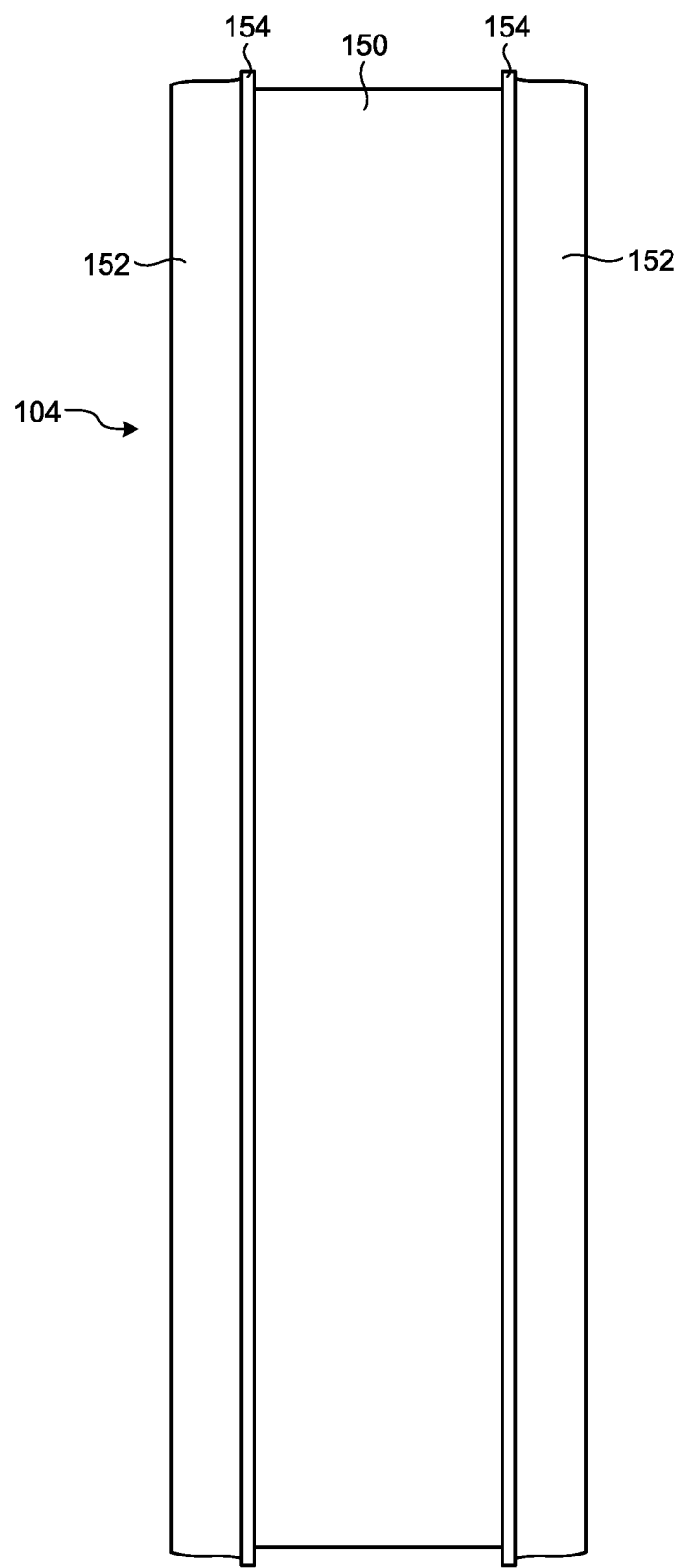
FIG. 12 is a top view of the ring-segment surface-side member of the ring segment according to the embodiment.

The following describes the ring-segment surface-side member 104 with reference to FIGS. 3 to 5 and 10 to 12. FIG. 10 is a perspective view of the ring-segment surface-side member of the ring segment according to the present embodiment. FIG. 11 is a front view of the ring-segment surface-side member of the ring segment according to the present embodiment. FIG. 12 is a top view of the ring-segment surface-side member of the ring segment according to the present embodiment. The ring-segment surface-side member (also simply referred to as "surface-side member") 104 is formed of a ceramic matrix composite (also referred to as "CMC"). The CMC is a material improved in strength by complexing ceramic with inorganic particles, metal particles, whiskers, short fibers, long fibers, and the like. The CMC has a specific gravity smaller than and a thermal resistance higher than, for example, those of a nickel matrix superalloy, and thus is suitable as the material of the ring segment. The CMC is roughly classified into an oxide group (for example, $Al_2O_3$ (aluminum oxide)) and a non-oxide group (for example, SiC (silicon carbide)), and in the present embodiment, CMC obtained by complexing SiC ceramic in the non-oxide group with SiC fibers is used.

The surface-side member 104 includes a surface portion 150, turned-back portions 152, and protrusion portions 154. The surface-side member 104, in which the surface portion 150, the turned-back portions 152, and the protrusion portions 154 are coupled with each other, has a shape that can be formed by, for example, bending a single plate. The surface portion 150 is a plate member extending in the rotational axis direction and the radial direction of the gas turbine 1. The surface portion 150 is an end face of the ring segment 52 on the inner side in the radial direction of the gas turbine 1, and serves as a part of the gas flow path. Specifically, a surface 170 of the surface portion 150 on the inner side in the radial direction of the gas turbine 1 is exposed to the combustion gas flow path R1. A back surface 172 of the surface portion 150 opposite to the surface 170 faces the opposing portion 135. The space between the back surface 172 and the opposing portion 135 is the cooling flow path 120.

The turned-back portions 152 are provided at both ends of the surface portion 150 in the rotational axis direction of the gas turbine 1. Each turned-back portion 152 includes a first part 162 and a second part 164. One end part of the first part 162 is coupled with an end part of the surface portion 150 in the rotational axis direction of the gas turbine 1, and the other end part is on the outer side of the one end part in the radial direction of the gas turbine 1. In other words, the first part 162 extends outward in the radial direction of the gas turbine 1 from the end part of the surface portion 150 in the rotational axis direction of the gas turbine 1. One end part of the second part 164 is coupled with the other end part of the first part 162, and the other end part is closer to a central line 159 of the surface-side member 104 in the rotational axis direction of the gas turbine 1 than the one end part. In other words, the second part 164 extends toward the central line 159 side of the surface portion 150 from the end part of the first part 162. The second part 164 of the turned-back portion 152 is disposed on the outer side of the second protrusion portion 134 of the support-side member 102 in the radial direction of the gas turbine 1. A surface of the second part 164 on the inner side in the radial direction of the gas turbine 1 faces and is in contact with a surface of the second protrusion portion 134 on the outer side in the radial direction of the gas turbine 1. Accordingly, the surface-side member 104 is engaged with the second protrusion portion 134 of the support-side member 102 through the surface portion 150 and the turned-back portion 152. In the turned-back portion 152, the second part 164 is in contact with the second protrusion portion 134, and the first part 162 is not in contact with the first protrusion portion 132.

The protrusion portion 154 extends outward from the turned-back portion 152 in the radial direction of the gas turbine 1. A surface of the protrusion portion 154 on the central line 159 side of the surface-side member 104 in the rotational axis direction of the gas turbine 1 faces the support-side member 102. A surface of the protrusion portion 154 on an end part side of the surface-side member 104 in the rotational axis direction of the gas turbine 1 faces the heat shielding ring 46. The surface of the protrusion portion 154 facing the heat shielding ring 46 is in contact with the seal mechanism 114. Accordingly, the gap between the protrusion portion 154 and the heat shielding ring 46 is sealed by the seal mechanism 114. The seal mechanism 114 seals the gap between the protrusion portion 154 and the heat shielding ring 46, and accordingly, the seal mechanism 114 and the surface-side member 104 seal the gap between the heat shielding rings 46. A side-surface seal mechanism including the seal groove 116c and the seal plate 125 inserted therein serves as a surface-side member side-surface seal mechanism forming a seal structure connected with the surface-side member 104 that is in contact with the seal mechanism 114.

The flow-path resistance adjustment mechanism 122 is provided on the cooling flow path 120. The flow-path resistance adjustment mechanism 122 adjusts the flow-path resistance of the cooling flow path 120 or air flow easiness so that the pressure of cooling air in the cooling flow path 120 on the upstream side in the combustion gas flow through the gas turbine 1 is higher than the pressure of cooling air in the cooling flow path 120 on the downstream side. The flow-path resistance adjustment mechanism 122 includes two dividing plates 124 and the through-holes 136a, 136b, and 136c. Each dividing plate 124 protrudes in a direction departing from the opposing portion 135, and a front end of the dividing plate 124 is in contact with the surface-side member 104. One of the dividing plates 124 is disposed between the through-hole 136a and the through-hole 136b, and the other dividing plate 124 is disposed between the through-hole 136b and the through-hole 136c. The dividing plates 124 extend from one end to the other end of the ring segment 52 in the rotational direction of the gas turbine 1. The hole diameters of the through-holes 136a, 136b, and 136c decrease in the order of the through-hole 136a, the through-hole 136b, and the through-hole 136c. In other words, the through-hole 136a has a diameter larger than that of the through-hole 136b. The through-hole 136b has a diameter larger than that of the through-hole 136c. In other words, the hole diameters of the through-holes decrease as the position moves from the upstream side to the downstream side in the combustion gas flow.

Accordingly, the flow-path resistance adjustment mechanism 122 can adjust the flow-path resistance to vary among three spaces of the cooling flow path 120 divided by the dividing plates 124. As a result, the flow-path resistance is smaller on the upstream side in the combustion gas flow through the gas turbine 1 than on the downstream side, which leads to a reduced pressure loss and achieves supply of cooling air at higher pressure.

The following describes a ring-segment cooling method through description of the flow path of the cooling air CA flowing through the ring segment 52. In the ring segment 52, the cooling air CA supplied to the cavity 80 passes through the through-holes 136a, 136b, and 136c and is supplied to each space of the cooling flow path 120 divided by the dividing plates 124. Specifically, the cooling air CA passes through the ring-segment support-side member 102 and flows into the cooling flow path between the ring-segment support-side member 102 and the ring-segment surface-side member 104. The cooling air CA having passed through the through-holes 136a, 136b, and 136c flows inside the cooling flow path 120 from the center toward an end part in the rotational direction of the gas turbine 1. The cooling air CA flows through the cooling flow path 120 in both directions along the rotational direction of the gas turbine 1, in other words, in two directions departing from each of the through-holes 136a, 136b, and 136c in the rotational direction. The cooling air CA having flowed into the cooling flow path 120 also flows into a cooling space between each side surface of the ring-segment support-side member 102 in the axial direction and the first part (side surface member) 162 of the ring-segment surface-side member 104. Accordingly, the side surface of the ring-segment support-side member 102 in the axial direction and the first part 162, in other words, parts of the ring-segment support-side member and the ring-segment surface-side member facing each other in the axial direction in the cooling flow path 120 are cooled. The cooling air CA having moved to an end part of the ring segment 52 in the rotational direction of the gas turbine 1 is discharged to the combustion gas flow path R1 through the gap between the ring segments 52. In other words, the cooling air CA having moved to the end part of the ring segment 52 in the rotational direction of the gas turbine 1 is discharged to the combustion gas flow path R1 through the gap between the ring-segment surface-side member 104 and another ring-segment surface-side member 104 adjacent thereto in the rotational direction. In addition, the cooling air CA having moved to the end part of the ring segment 52 in the rotational direction of the gas turbine 1 flows into the gap between the ring-segment support-side member 102 and another ring-segment support-side member 102 adjacent thereto, and cools a side surface of the ring-segment support-side member 102 in the rotational direction. In this manner, the ring segment 52 is cooled by the flow of the cooling air CA.

As described above, in the ring segment 52, the ring-segment surface-side member 104 formed of the CMC is disposed on the inner side of the ring-segment support-side member 102 formed of metal in the radial direction of the gas turbine 1, and has a shape forming the combustion gas flow path R1, which leads to a high thermal resistance of the ring segment 52.

In the ring segment 52, the seal groove 138 and the seal plate 126 are provided on the inner side of an end part of the turned-back portion 152 on the outer side in the radial direction of the gas turbine 1, which shortens the distance between the cavity 80 and the cooling flow path 120. Accordingly, the ring-segment support-side member 102 can be efficiently cooled to reduce increase of the temperature of the ring-segment support-side member 102.

In the ring segment 52, the ring-segment surface-side member 104 includes the protrusion portions 154, and the seal mechanism 114 is provided between each protrusion portion 154 and the corresponding heat shielding ring 46 to achieve sealing. With this configuration, a seal mechanism can be formed in a ring shape, which facilitates installation and improves the sealing property. The high sealing property leads to reduction of air leakage and efficient use of air. Specifically, the amount of air leaking to the combustion gas flow path can be reduced while the ring segment 52 is appropriately cooled. Accordingly, the amount of compressed air used as cooling air can be reduced, and the amount of leakage air that decreases the temperature of the combustion gas can be reduced, thereby improving the efficiency of the gas turbine 1.

In the ring segment 52, the gap between the back surface 172 and the opposing portion 135 serves as a cooling path, the second part 164 of the turned-back portion 152 is in contact with the second protrusion portion 134, and the first part 162 is not in contact with the first protrusion portion 132. With this configuration, part of the support-side member 102 being in contact with the surface-side member 104 is positioned far from the combustion gas flow path. Accordingly, the temperature around a part at which the support-side member 102 and the surface-side member 104 are in contact with each other can be lowered to reduce increase of the temperature of the support-side member 102. In addition, the support-side member 102 and the surface-side member 104 can be prevented from being in contact with each other at a position at which the temperature is high.

In the ring segment 52, the flow-path resistance adjustment mechanism 122 is provided to adjust pressure balance of cooling air flowing through the cooling flow path 120 so that the cooling air CA can efficiently flow and the amount of the cooling air CA can be reduced.

In the ring segment 52, the flow-path resistance adjustment mechanism 122 adjusts the pressure of cooling air flowing through the cooling flow path 120 on the upstream side in the direction of combustion gas flow through the gas turbine 1 to be higher than the pressure of cooling air flowing in the cooling space downstream in the direction of combustion gas flow so that the cooling air CA can efficiently flow.

In the ring segment 52, the dividing plates (partitions) 124 are provided as the flow-path resistance adjustment mechanism 122 to separate the cooling flow path 120 into a plurality of spaces in a cross section orthogonal to the rotational direction. With this configuration, the cooling flow path 120 is separated in the flow direction of the combustion gas so that the pressure of cooling air can be easily changed depending on the position in the flow direction of the combustion gas.

In the ring segment 52, the dividing plates 124 are provided to the ring-segment support-side member 102, which simplifies the structure of the ring-segment surface-side member 104. In the ring segment 52, the ring-segment surface-side member 104 has a cross section in a traversable shape, in other words, a structure formed by bending a single plate as in the present embodiment, which simplifies manufacturing.

In the ring segment 52, the through-holes 136a, 136b, and 136c are provided only near the center in the rotational direction of the gas turbine 1, and air flows through the cooling flow path 120 in the rotational direction of the gas turbine 1. With this configuration, the ring-segment support-side member 102 and the ring-segment surface-side member 104 can be cooled at appropriate balance. Specifically, in face-to-face cooling in which air flows through the cooling flow path 120 in the rotational direction of the gas turbine 1, the cooling amount of the ring-segment surface-side member 104 relative to the cooling amount of the ring-segment support-side member 102 can be reduced as compared to a case of impingement cooling. Accordingly, in the ring segment 52, the ring-segment surface-side member 104 formed of the CMC and having a high thermal resistance is prevented from being excessively cooled while the ring-segment support-side member 102 formed of metal is sufficiently cooled.

In the ring segment 52, as in the present embodiment, the through-holes 136a, 136b, and 136c are formed at positions at the center of the support-side member 102 in the rotational direction of the gas turbine 1 so that the total area of the through-holes in a central region is larger than the total area of the through-holes in an end part region in the rotational direction of the gas turbine 1. With this configuration, cooling air supplied to the cooling flow path 120 between the ring-segment support-side member 102 and the ring-segment surface-side member 104 efficiently flows from the center to the end part in the rotational direction of the gas turbine 1, efficiently performing convection cooling. When L represents the distance between the center of the ring segment 52 and the end part in the rotational direction of the gas turbine 1, the central region is positioned at (¼)L from the center and the end part region is positioned at (¼)L from the end part.

Figure 13:
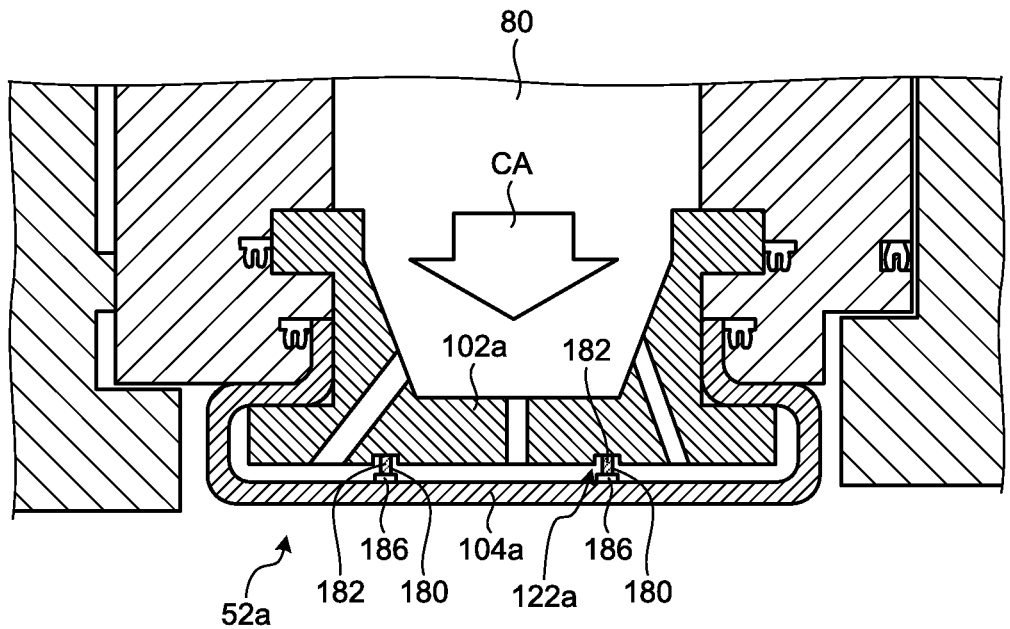
FIG. 13 is a partial enlarged diagram illustrating the vicinity of a side surface of a ring segment of a gas turbine according to another embodiment.

The following describes a ring segment according to another embodiment with reference to FIG. 13. FIG. 13 is a partial enlarged diagram illustrating the vicinity of a side surface of a ring segment of a gas turbine according to another embodiment. This ring segment 52a illustrated in FIG. 13 is the same as the ring segment 52 except for a partial shape. The following description will be mainly made on any different structure of the ring segment, and any part having an identical structure is denoted by an identical reference sign, and description thereof will be omitted.

In the ring segment 52a illustrated in FIG. 13, a flow-path resistance adjustment mechanism 122a is formed as a member separated from a ring-segment support-side member 102a and a ring-segment surface-side member 104a. The flow-path resistance adjustment mechanism 122a includes dividing plates 180 and buffer materials 186. The ring-segment support-side member 102a includes recesses 182 where the dividing plates 180 are disposed. The recesses 182 extend in the rotational direction of the gas turbine 1. Similarly to the dividing plates 124 of the flow-path resistance adjustment mechanism 122, the dividing plates 180 separate the cooling flow path 120 into a plurality of spaces. The dividing plate 180 does not need to completely separate the path into spaces, but air may flow through the spaces as long as pressure difference is maintained between the spaces. The dividing plate 180 is inserted into the recess 182, protruding toward the ring-segment surface-side member 104a. The buffer material 186 is disposed between the dividing plate 180 and the ring-segment surface-side member 104a. The buffer material 186 is formed of a thermal-resistant material having low reactivity with the CMC forming the ring-segment surface-side member 104a, for example, a material other than metal. The buffer material 186 may be, for example, SiC felt.

In this manner, in the ring segment 52a, the flow-path resistance adjustment mechanism 122a may be a member separated from the ring-segment support-side member 102a and the ring-segment surface-side member 104a. Accordingly, each member can be easily manufactured.

In the ring segment 52a, the buffer material 186 formed of a material having low reactivity with the CMC is provided as a reaction prevention layer between the dividing plate 180 and the ring-segment surface-side member 104a, which leads to high durability of the ring-segment surface-side member 104a. The surface portion 150 of the ring-segment surface-side member 104a is in contact with the combustion gas flow path and thus is raised to high temperature. The surface portion 150 having been raised to high temperature is made of metal, which leads to occurrence of reaction through contact with another member. However, since the buffer material 186 is provided, reaction of the surface portion 150 having been raised to high temperature with another member can be prevented, which leads to high durability. Although the buffer material 186 is provided in the present embodiment, the dividing plate 180 may be formed of a thermal-resistant material having low reactivity with the CMC forming the ring-segment surface-side member 104*a*. In short, the same effect can be obtained when a member being in contact with the back surface 182 of the ring-segment surface-side member 104*a*, which becomes in contact with the CMC at high temperature, is formed of a material having low reactivity with the CMC. Furthermore, it is preferable that a buffer material is provided between each dividing plate 124 and the surface portion 150 of the ring segment 52. In this manner, when the dividing plate (partition) as a part, which comes in contact with the surface of the ring-segment surface-side member opposite to the surface portion, is made of a material other than metal, the ring-segment surface-side member can be protected, which leads to high durability.

Figure 14:
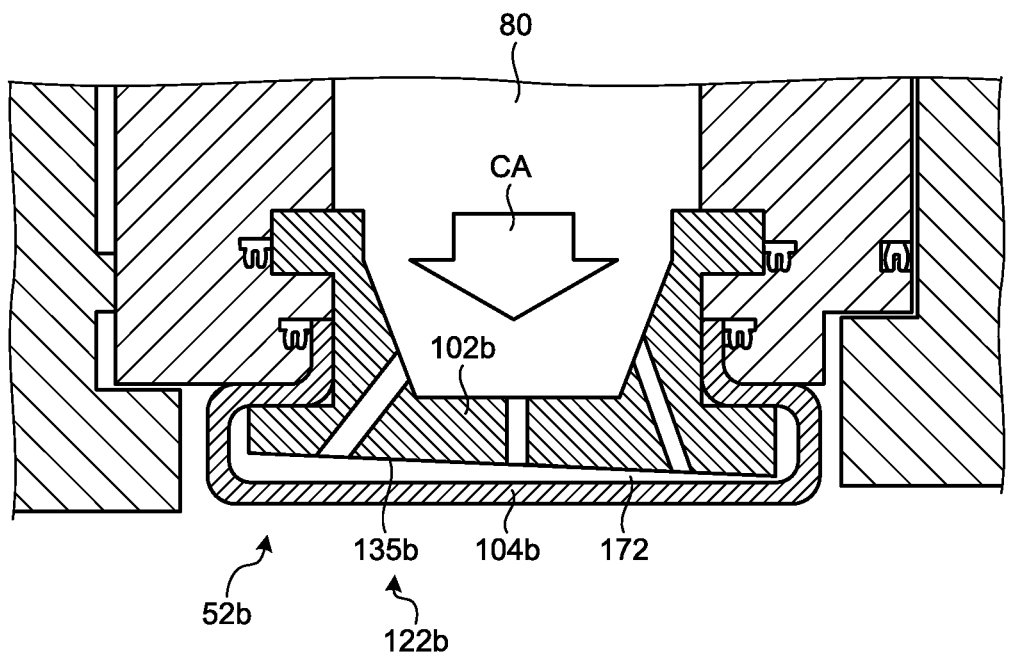
FIG. 14 is a partial enlarged diagram illustrating the vicinity of a side surface of a ring segment of a gas turbine according to another embodiment.

The following describes a ring segment according to another embodiment with reference to FIG. 14. FIG. 14 is a partial enlarged diagram illustrating the vicinity of a side surface of a ring segment of a gas turbine according to another embodiment. This ring segment 52*b* illustrated in FIG. 14 is the same as the ring segment 52 except for a partial shape. The following description will be mainly made on any different structure of the ring segment 52*b*, and any part having an identical structure is denoted by an identical reference sign, and description thereof will be omitted.

The ring segment 52*b* includes a ring-segment support-side member 102*b* and a ring-segment surface-side member 104*b*. In the ring segment 52*b*, an opposing portion 135*b* is included in a flow-path resistance adjustment mechanism 122*b*. The structure of the ring segment 52*b* includes structures in which the position of the opposing portion 135*b* of the ring-segment support-side member 102*b* in the radial direction of the gas turbine varies. In one embodiment of the present application, the opposing portion 135*b* of the ring-segment support-side member 102*b* is tilted relative to the back surface 172 of the ring-segment surface-side member 104*b*. Specifically, the opposing portion 135*b* is tilted in a direction getting closer to the back surface 172 of the ring-segment surface-side member 104*b* as going from the upstream side toward the downstream side in the direction of combustion gas flow.

In the ring segment 52*b*, the flow-path resistance adjustment mechanism 122*b* is configured by forming the opposing portion 135*b* in a shape getting closer to the back surface 172 of the ring-segment surface-side member 104*b* as going from the upstream side toward the downstream side in the direction of combustion gas flow, and accordingly, the cooling flow path narrows as the position moves from the upstream side toward the downstream side in the direction of combustion gas flow. With this configuration, the flow-path resistance adjustment mechanism 122*b* has higher flow-path resistance as the position moves from the upstream side toward the downstream side in the direction of combustion gas flow, and thus the pressure of cooling air on the upstream side is higher than the pressure of cooling air on the downstream side.

Although the tilt of the opposing portion 135*b* is changed in the flow-path resistance adjustment mechanism 122*b*, any structure in which the flow-path resistance changes are applicable. For example, the surface roughness of the opposing portion 135*b* may be changed, or the opposing portion 135*b* may be provided with a protrusion. Alternatively, the flow-path resistance of the flow-path resistance adjustment mechanism 122*b* may be changed in the rotational axis direction of the gas turbine 1.

Specifically, the flow-path resistance adjustment mechanism 122*b* may have such a shape that the height of the cooling flow path 120 decreases as the position moves from the center toward an end part in the rotational axis direction of the gas turbine 1. The flow-path resistance adjustment mechanism 122*b* may be further provided with a dividing plate. The dividing plate of the flow-path resistance adjustment mechanism 122*b* may have a shape, the width of which changes in the rotational axis direction of the gas turbine 1.

The flow-path resistance adjustment mechanisms 122, 122*a*, and 122*b* of the ring segments 52, 52*a*, and 52*b* disclosed in the present specification may be each used alone or may be used in combination. When the flow-path resistance adjustment mechanisms 122, 122*a*, and 122*b* are combined, the ring segments 52, 52*a*, and 52*b* can easily have structures in which the flow-path resistance increases as the position moves from the upstream side toward the downstream side in the direction of combustion gas flow, and thus the pressure of cooling air on the upstream side is further increased compared with the pressure of cooling air on the downstream side.

Figure 15:
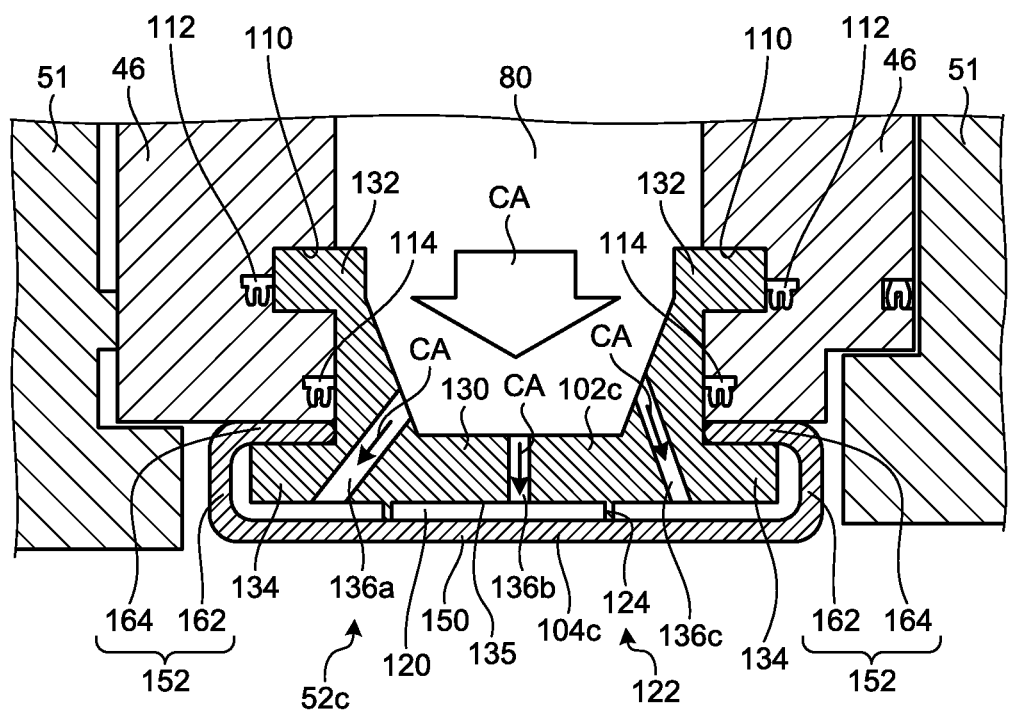
FIG. 15 is a partial enlarged diagram illustrating the vicinity of a side surface of a ring segment of a gas turbine according to another embodiment.

The following describes a ring segment according to another embodiment with reference to FIG. 15. FIG. 15 is a partial enlarged diagram illustrating the vicinity of a side surface of a ring segment of a gas turbine according to another embodiment. This ring segment 52*c* illustrated in FIG. 15 is the same as the ring segment 52 except for a partial shape. The following description will be mainly made on any different structure of the ring segment 52*c*, and any part having an identical structure is denoted by an identical reference sign, and description thereof will be omitted.

The ring segment 52*c* includes a ring-segment support-side member 102*c* and a ring-segment surface-side member 104*c*. The ring-segment surface-side member 104*c* has a structure same as that of the ring-segment surface-side member 104 except that no protrusion portion 154 is included. In the ring segment 52*c*, the ring-segment support-side member 102*c* is in contact with the seal mechanism 114.

With the structure including no protrusion portion 154, the ring segment 52*c* has a degraded sealing property but can efficiently use the seal air through pressure adjustment by the flow-path resistance adjustment mechanism 122.

Figure 16:
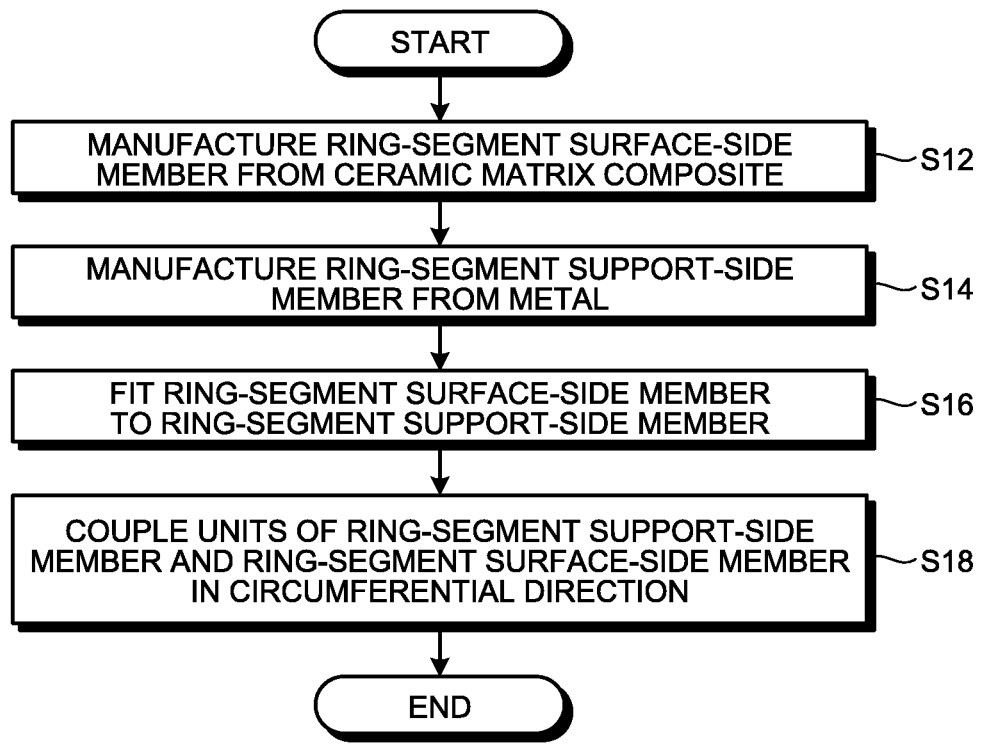
FIG. 16 is a flowchart illustrating an exemplary ring segment manufacturing method.

The following describes a ring segment manufacturing method with reference to FIG. 16. FIG. 16 is a flowchart illustrating an exemplary ring segment manufacturing method. The present embodiment describes a case in which the ring segment 52 is manufactured. First, the ring-segment surface-side member 104 is manufactured from the ceramic matrix composite (step S12). The ring-segment surface-side member 104 can be manufactured by a method of manufacturing a component produced from the ceramic matrix composite. Subsequently, the ring-segment support-side member 102 is manufactured from metal (step S14). The ring-segment support-side member 102 can be manufactured by performing machine processing such as molding, machining, or polishing. Steps S12 and S14 may be executed in the reverse order or in parallel. A plurality of ring-segment surface-side members 104 and ring-segment support-side members 102 may be simultaneously manufactured.

Subsequently, the ring-segment surface-side member is fitted to the ring-segment support-side member (step S16). Specifically, the ring-segment surface-side member 104 is fitted to the ring-segment support-side member 102 while the second part (protrusion portion) 164 of the ring-segment surface-side member 104 is positioned on the outer side of the second protrusion portion (protrusion portion) 134 of the ring-segment support-side member 102 in the radial direction of the gas turbine 1, thereby forming the cooling flow path 120 between the ring-segment surface-side member 104 and the ring-segment support-side member 102. The ring-segment surface-side member 104 can be fitted to the ring-segment support-side member 102 by relatively moving the ring-segment support-side member 102 and the ring-segment surface-side member 104 in an extension direction (direction along the rotational direction of the gas turbine when installed).

Subsequently, the ring segments as units of the ring-segment support-side member 102 and the ring-segment surface-side member 104 are coupled with each other in the circumferential direction (step S18). The plurality of ring segments are connected into a ring shape and serve as a part of the outer peripheral surface of a flow path through which the combustion gas passes. When each ring segment 52 is coupled with another ring segment 52, the seal plate 126 is disposed between the adjacent ring segments 52. The ring segment 52 may be installed between the heat shielding rings 46 after the ring-segment support-side member 102 and the ring-segment surface-side member 104 are fitted to each other, or the ring-segment support-side member 102 and the ring-segment surface-side member 104 may be fitted to each other after the ring-segment support-side member 102 is installed between the heat shielding rings 46.

As described above, the ring segment 52 can be easily manufactured through assembly by fitting the ring-segment surface-side member 104 to the ring-segment support-side member 102 while the ring-segment support-side member 102 and the ring-segment surface-side member 104 are combined and the second part (protrusion portion) 164 of the ring-segment surface-side member 104 is positioned on the outer side of the second protrusion portion (protrusion portion) 134 of the ring-segment support-side member 102 in the radial direction.

REFERENCE SIGNS LIST 1 gas turbine
5 compressor
6 combustor
7 turbine
8 turbine shaft
11 air intake
12 compressor casing
13 compressor vane
14 compressor blade
21 inner cylinder
22 transition piece
23 outer cylinder
24 casing chamber
31 turbine casing
32 turbine vane
33 turbine blade
41 vane ring cavity
45 vane ring
46 heat shielding ring
51 outer shroud
52 ring segment
53 vane-shaped portion
80 cavity
102 ring-segment support-side member
104 ring-segment surface-side member
110 recess
112, 114 seal mechanism
116 seal groove
120 cooling flow path
122 flow-path resistance adjustment mechanism
124 dividing plate
126 seal plate
130 body portion
132 first protrusion portion
134 second protrusion portion
135 opposing portion (opposing surface)
136a, 136b, 136c through-hole
138, 139 seal groove
150 surface portion
152 turned-back portion
154 protrusion portion
159 central line
162 first part
164 second part
170 surface
172 back surface
CA cooling air

The invention claimed is:

1. A ring-segment surface-side member of a ring segment disposed at a position opposite to a turbine blade with respect to a radial direction of the gas turbine on a stationary side of a gas turbine, and forming a part of a combustion gas flow path through which combustion gas flows, the ring-segment surface-side member being supported by a ring-segment support-side member, the ring-segment surface-side member being formed of a ceramic matrix composite,
the ring-segment surface-side member comprising:
a surface portion forming the combustion gas flow path;
a turned-back portion including a first part extending outward in a radial direction of the gas turbine from the surface portion and a second part extending toward a central line of the surface portion from an end part of the first part; and
a protrusion portion extending outward from the turned-back portion in the radial direction of the gas turbine,
wherein the surface portion has a back surface on an outer side in the radial direction,
wherein a cooling space, in which cooling air flows, is formed by the back surface, an opposing portion that is an end face of the ring-segment support-side member on an inner side in the radial direction, and a flow-path resistance adjuster provided on the opposing portion,
wherein the flow-path resistance adjuster includes:
a plurality of dividing plates arranged to divide the cooling space into a plurality of cooling rooms arranged along a direction of combustion gas flow, and
a plurality of through-holes each configured to supply cooling air to a respective one of the plurality of cooling rooms, and
wherein the flow-path resistance adjuster is configured to adjust a pressure of the cooling air flowing in the cooling space such that a pressure of the cooling air in an upstream-most one of the cooling rooms with respect to a direction of combustion gas flow through the gas turbine is higher than a pressure of the cooling air in a downstream-most one of the cooling rooms with respect to the direction of combustion gas flow.

2. A ring-segment support-side member that is included in a ring segment disposed at a position opposite to a turbine blade with respect to a radial direction of the gas turbine on a stationary side of a gas turbine, and supports a ring-segment surface-side member serving as a part of a combustion gas flow path through which combustion gas flows,
the ring-segment support-side member being formed of metal,
the ring-segment support-side member comprising:
an engagement portion to be engaged with the ring-segment surface-side member; and
an opposing portion that:
faces a back surface of the surface portion of the ring-segment surface-side member, the surface portion forming the combustion gas flow path, and
has a surface forming a cooling space in which cooling air flows between the opposing portion and the surface portion,
wherein the opposing portion includes a flow-path resistance adjuster configured to adjust a flow-path resistance of the cooling space, the flow-path resistance adjuster including:
a plurality of dividing plates arranged to divide the cooling space into a plurality of cooling rooms arranged along a direction of combustion gas flow, and
a plurality of through-holes each configured to supply cooling air to a respective one of the plurality of cooling rooms, and
and
wherein the flow-path resistance adjuster is configured to adjust a pressure of the cooling air flowing in the cooling space such that a pressure of the cooling air in an upstream-most one of the cooling rooms with respect to a direction of combustion gas flow through the gas turbine is higher than a pressure of the cooling air in a downstream-most one of the cooling rooms with respect to the direction of combustion gas flow.

3. The ring-segment support-side member according to claim 2, further comprising a plurality of through-holes that connect the opposing portion with a cooling air supply space into which the cooling air is supplied, and through which the cooling air flows,
wherein each of the plurality of through-holes has a cross-sectional area differing in a direction of combustion gas flow through the gas turbine.

4. The ring-segment support-side member according to claim 2, wherein the opposing portion is tilted in a direction so as to be closer to the back surface of the ring-segment surface-side member in a direction from a combustion gas flow upstream side of the ring-segment support-side member toward a combustion gas flow downstream side of the ring-segment support-side member.

5. The ring-segment support-side member according to claim 2, wherein the opposing portion of the flow-path resistance adjuster has at least one of (i) a surface having a surface roughness that varies with position, and (ii) a surface having a non-level part.

6. The ring-segment support-side member according to claim 2, wherein the flow-path resistance adjuster includes a dividing plate separating the cooling space into a plurality of spaces in a cross section orthogonal to a rotational direction.

7. The ring-segment support-side member according to claim 6, wherein the dividing plate is provided integrally with the opposing portion.

8. The ring-segment support-side member according to claim 6, wherein the dividing plate is a plate member inserted in a groove on the surface of the opposing portion facing the back surface.

9. The ring-segment support-side member according to claim 6, wherein a part of the dividing plate which comes in contact with a surface of the ring-segment surface-side member opposite to the surface portion with respect to a radial direction of the gas turbine is made of a material different from the material of the ring-segment support-side member.

10. A ring segment comprising:
the ring-segment surface-side member according to claim 1; and
the ring-segment support-side member disposed on the outer side of the ring-segment surface-side member in the radial direction of the gas turbine, the ring-segment support-side member supporting the ring-segment surface-side member to form a cooling space in which the cooling air flows between the ring-segment support-side member and the ring-segment surface-side member, and formed of metal,
wherein the ring-segment surface-side member includes a seal at at least one of (i) a position upstream of the protrusion portion with respect to the direction of combustion gas flow and (ii) a position downstream of the protrusion portion with respect to the direction of combustion gas flow.

11. A gas turbine comprising:
a turbine blade attached to a rotatable turbine shaft;
a turbine vane fixed facing the turbine blade in an axial direction;
the ring segment according to claim 10; and
a turbine casing disposed on an outer periphery of the ring segment and supporting the turbine vane.

12. A ring segment disposed at a position opposite to a turbine blade with respect to a radial direction of the gas turbine on a stationary side of a gas turbine, the ring segment comprising:
a ring-segment surface-side member serving as a part of a combustion gas flow path through which combustion gas flows and formed of a ceramic matrix composite; and
a ring-segment support-side member disposed on an outer side of the ring-segment surface-side member in a radial direction of the gas turbine, supporting the ring-segment surface-side member, forming a cooling space in which cooling air flows between the ring-segment support-side member and the ring-segment surface-side member, and formed of metal,
wherein the ring-segment support-side member includes:
a seal provided at an end face of the ring-segment support-side member in a rotational direction of the gas turbine, extending in an axial direction of the gas turbine, having both ends being in contact with members adjacent thereto in the axial direction, and sealing air flow in the radial direction of the gas turbine, and
a flow-path resistance adjuster configured to adjust a flow-path resistance of the cooling space
wherein the ring-segment surface-side member is disposed on an inner side of the seal in the radial direction of the gas turbine, and wherein the flow-path resistance dividing plate includes:
  a plurality of dividing plates arranged to divide the cooling space into a plurality of cooling rooms arranged along a direction of combustion gas flow, and
  a plurality of through-holes each configured to supply cooling air to a respective one of the plurality of cooling rooms, and
wherein the flow-path resistance dividing plate is configured to adjust a pressure of cooling air flowing in the cooling space such that a pressure of the cooling air in an upstream-most one of the cooling rooms with respect to a direction of combustion gas flow through the gas turbine is higher than a pressure of the cooling air in a downstream-most one of the cooling rooms with respect to the direction of combustion gas flow.

13. The ring segment according to claim 12, wherein the ring-segment surface-side member is supported at a position separated, in the radial direction of the gas turbine, from a position at which the ring-segment support-side member is supported by another member.

14. A gas turbine comprising:
  a turbine blade attached to a rotatable turbine shaft;
  a turbine vane fixed facing the turbine blade in an axial direction;
  the ring segment according to claim 12; and
  a turbine casing disposed on an outer periphery of the ring segment and supporting the turbine vane.

* * * * *